(12) United States Patent
Mishima et al.

(10) Patent No.: US 9,954,476 B2
(45) Date of Patent: Apr. 24, 2018

(54) MOTOR DRIVING APPARATUS

(71) Applicant: ROHM CO., LTD., Ukyo-Ku, Kyoto (JP)

(72) Inventors: Tomofumi Mishima, Kyoto (JP); Masahiro Nakamura, Kyoto (JP); Joji Noie, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/166,416

(22) Filed: May 27, 2016

(65) Prior Publication Data

US 2016/0352279 A1  Dec. 1, 2016

(30) Foreign Application Priority Data

May 27, 2015 (JP) ................. 2015-107584
May 27, 2015 (JP) ................. 2015-107585
Apr. 11, 2016 (JP) ................. 2016-079090

(51) Int. Cl.
G05B 11/28 (2006.01)
H02P 27/08 (2006.01)
(Continued)

(52) U.S. Cl.
CPC .............. *H02P 27/08* (2013.01); *F04D 25/08* (2013.01); *F04D 27/004* (2013.01); *G06F 1/20* (2013.01); *G06F 1/206* (2013.01); *H02P 6/16* (2013.01)

(58) Field of Classification Search
CPC . G05B 11/28; G05B 2219/42237; H02P 7/29; H02P 27/08; H02M 7/53873; H02M 7/53875; H02M 3/158
(Continued)

(56) References Cited

U.S. PATENT DOCUMENTS 4,123,692 A * 10/1978 Gilmore ............... H02M 3/158
                                                          318/722
4,217,527 A *  8/1980 Bourke ................. H02P 7/298
                                                          318/139
(Continued)

FOREIGN PATENT DOCUMENTS

JP    2004166429 A    6/2004
JP    2005224100 A    8/2005
JP    2009296839 A   12/2009

*Primary Examiner* — Rina Duda
(74) *Attorney, Agent, or Firm* — Cantor Colburn LLP

(57) ABSTRACT

A TH terminal receives an analog control voltage $V_{TH}$ which indicates a rotational speed. With a first platform, a capacitor and a discharging resistor are connected in parallel between an OSC terminal and the ground. A charging resistor and a first switch are arranged in series between the OSC terminal and a reference voltage line via which a stabilized voltage is supplied. When an oscillator voltage $V_{OSC}$ that occurs at the OSC terminal reaches an upper-side threshold $V_H$, a switching circuit turns off the first switch. When the oscillator voltage $V_{OSC}$ falls to a lower-side threshold value $V_L$, the switching circuit turns on the first switch. The oscillator voltage $V_{OSC}$ is compared with the voltage at the TH terminal, so as to generate a pulse-modulated control pulse S3.

8 Claims, 17 Drawing Sheets

(51) Int. Cl.
  *H02P 6/16* (2016.01)
  *G06F 1/20* (2006.01)
  *F04D 25/08* (2006.01)
  *F04D 27/00* (2006.01)

(58) Field of Classification Search
  USPC ........ 318/461, 599, 811; 388/800, 804, 811, 388/814, 819
  See application file for complete search history.

(56) References Cited

U.S. PATENT DOCUMENTS

| | | | | |
|---|---|---|---|---|
| 4,292,577 A * | 9/1981 | Cesarz | ................ | H02P 27/045 318/723 |
| 4,491,778 A * | 1/1985 | Knox | ............... | H02M 7/53873 318/803 |
| 5,630,008 A * | 5/1997 | Okuyama | ............. | G11B 19/00 318/376 |
| 6,377,008 B1 * | 4/2002 | Hirata | .................... | H02P 6/182 318/400.01 |
| 8,749,183 B2 * | 6/2014 | Bonvin | ................ | G11B 19/20 318/400.3 |

* cited by examiner

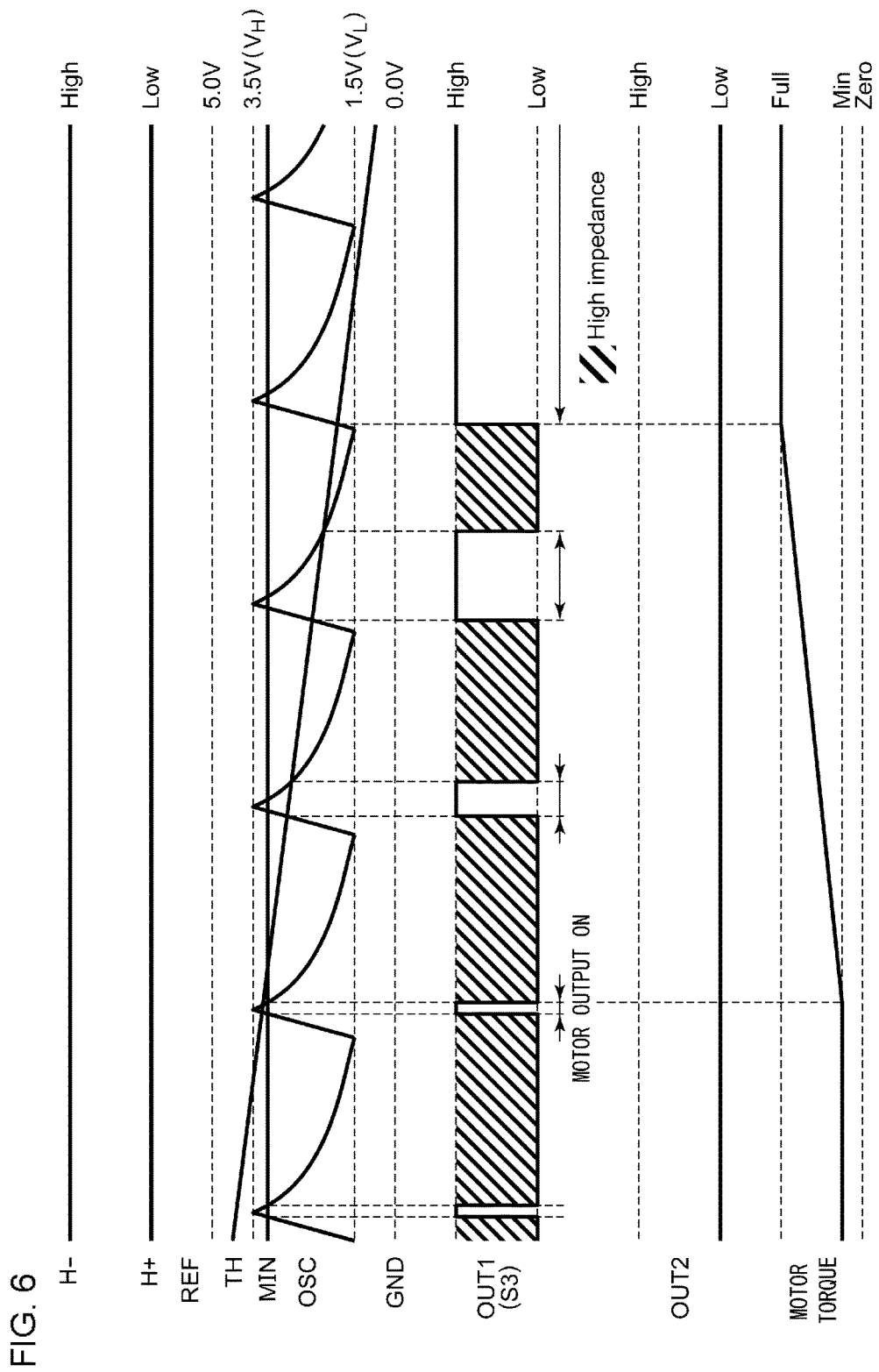

MOTOR DRIVING APPARATUS

CROSS REFERENCE TO RELATED APPLICATIONS

The present invention claims priority under 35 U.S.C. § 119 to Japanese Application No. 2015-107584 filed May 27, 2015; Japanese Application No. 2015-107585 filed May 27, 2015; and Japanese Application No. 2016-079090 filed Apr. 11, 2016, the entire contents of which are incorporated herein by reference.

BACKGROUND OF THE INVENTION

Field of the Invention

The present invention relates to a motor driving apparatus.

Description of the Related Art

In recent years, increase in the operation speed of personal computers and workstations has led to rapid increase in the operation speeds of computation LSIs (large Scale Integrated Circuit) such as CPUs (Central Processing Unit), DSPs (Digital Signal Processor), etc. Such LSIs have a problem in that an increase in the operation speed, i.e., an increase in clock frequency involves an increase in heat generation. The heat generation of the LSI leads to thermal runaway of the LSI itself, or affects its peripheral circuits, which becomes a problem. Accordingly, such a situation requires a suitable thermal cooling operation for the LSI or the like, as a crucial technique.

In many cases, in order to cool such an LSI, an electronic device employs an air-cooling system using a cooling fan as a cooling method. In this cooling method, for example, a cooling fan is arranged such that it faces the surface of the LSI so as to blow cool air onto the surface of the LSI. In the cooling operation of such a cooling fan for cooling the LSI, the temperature in the vicinity of the LSI is monitored, and the rotation of the fan is adjusted based on the temperature thus monitored, so as to adjust the cooling level.

FIG. 1 is a circuit diagram showing a cooling apparatus including a fan motor driving IC (Integrated Circuit) investigated by the present inventors. It should be noted that any kind of configuration as shown in FIG. 1 cannot be recognized as a known technique.

A cooling apparatus 2r includes a fan motor 6 and a driving apparatus 9r that drives the fan motor 6. The driving apparatus 9r is configured including a driving IC 200r and its peripheral components. The components of the driving apparatus 9r are mounted on a common printed circuit board.

The fan motor 6 is configured as a brushless DC motor. A Hall sensor 8 is arranged in the vicinity of the fan motor 6 in order to detect the position of a rotor. The first pin and the sixteenth pin configured as a ground terminal (GND) are each grounded. The power supply voltage $V_{DD}$ is input to the third pin (VCC) of the driving IC 200r via a reverse-current blocking diode D1. The output of a driving stage 230 is connected to the fan motor 6 via the second pin (OUT2) and the fifteenth pin (OUT1). It should be noted that, in the present specification, each pin number is defined for convenience. That is to say, there is no relation between the pin number definition and the pin layout or the like.

A Hall bias circuit 204 generates a Hall bias voltage $V_{HB}$, and supplies the Hall bias voltage $V_{HB}$ thus generated to the Hall sensor 8 via a Hall bias (HB) terminal configured as the tenth pin. Hall signals H+ and H− generated by the Hall sensor 8 are respectively input to Hall input terminals (H+ and H−) configured as the ninth pin and eleventh pin. A Hall comparator 202 compares the Hall signals H− and H+, generates a pulse signal S1 which indicates the position of the rotor, and outputs the pulse signal S1 thus generated to a control logic circuit 208. The control logic circuit 208 performs a commutation control operation in synchronization with the pulse signal S1.

A reference voltage source 214 generates a reference voltage $V_{REF}$ stabilized to a predetermined voltage level. The reference voltage $V_{REF}$ is output to an external circuit via a reference voltage terminal (REF) configured as the twelfth pin.

A capacitor C1 is connected as an external component to the oscillator terminal (OSC) configured as the sixth pin. An oscillator 220 charges and discharges the capacitor C1 so as to generate an oscillator voltage $V_{OSC}$ having a triangle waveform.

A minimum rotational speed setting terminal (MIN) configured as the fourth pin receives, as its input signal, a voltage $V_{MIN}$ which indicates the minimum rotational speed to be set for the fan motor 6. The voltage $V_{MIN}$ which is input to the MIN terminal, is generated by dividing the reference voltage $V_{REF}$ by means of resistors R11 and R12.

A PWM comparator 216 compares the voltage $V_{MIN}$ input to the MIN terminal with the oscillator voltage $V_{OSC}$. An output S2 of the PWM comparator 216 has a duty ratio that corresponds to the voltage $V_{MIN}$ input to the MIN terminal.

A PWM comparator 218 compares a voltage $V_{TH}$ input to a rotational speed control terminal (TH) configured as the fifth pin with the oscillator voltage $V_{OSC}$. An output S3 of the PWM comparator 218 has a duty ratio that corresponds to the voltage $V_{TH}$ at the TH terminal.

A PWM input terminal receives, as its input signal, an input PWM signal having a duty ratio (input duty ratio) that corresponds to a target rotational speed for the fan motor 6. The input PWM signal is inverted by an inverter 10. Subsequently, the input PWM signal thus inverted is smoothed by an RC filter 12, and is input to the TH terminal.

The control logic circuit 208 logically combines the output pulses S2 and S3 respectively output from the PWM comparators 216 and 218, so as to generate a pulse signal S4. The duty ratio of the pulse signal S4 is set to the larger of the output pulses S2 and S3 respectively output from the PWM comparators 216 and 218.

The driving stage 230 includes Hall amplifiers 232 and 234. The Hall amplifier 232 amplifies the difference between the Hall signals H+ and H− with a first polarity, and outputs the signal difference thus amplified via the OUT2 terminal. The Hall amplifier 234 amplifies the difference between the Hall signals H+ and H− with a second polarity, and outputs the signal difference thus amplified via the OUT15 terminal. The Hall amplifiers 232 and 234 each include a push-pull output stage. The respective output stages of the Hall amplifiers 232 and 234 switch on and off according to the pulse signal S4 received from the control logic circuit 208. The output voltages of the OUT1 terminal and the OUT2 terminal are alternately set to an active state according to the output S1 of the Hall comparator 202 (commutation control operation). In the active state, the corresponding output voltage has a waveform with an envelope obtained by amplifying the Hall signal. Furthermore, the output voltage is switched between an on state and a high-impedance state with a duty ratio that corresponds to the output pulse S3 (or S2) of the PWM comparator 218 (or 216).

A lock protection circuit 240 detects a motor lock state that can occur in the fan motor 6. A TSD circuit 242 detects an overheating state. A signal output circuit 244 generates an alert signal which indicates a malfunction, and outputs the alert signal via an alert terminal (AL) configured as the eighth pin. Furthermore, the signal output circuit 244 generates an FG (Frequency Generator) signal having a frequency that corresponds to the rotational speed of the fan motor 6, and outputs the FG signal via an FG terminal configured as the seventh pin.

FIG. 2 is an operational waveform diagram showing the operation of the driving IC 200r shown in FIG. 1. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding. FIG. 2 shows expanded waveforms in a sufficiently short time scale as compared with the periods of the Hall signals H+ and H−.

Accordingly, in the range shown in FIG. 2, the waveforms of the Hall signals H+ and H− each have a substantially constant voltage level. The output OUT1 has a duty ratio that corresponds to a comparison result obtained by comparing the oscillator voltage $V_{OSC}$ with a lower voltage from among $V_{MIN}$ and $V_{TH}$. With such an arrangement, the torque (rotational speed) of the fan motor 6 is raised according to an increase in the duty ratio of the input PWM signal. Furthermore, such an arrangement allows the minimum torque, i.e., the minimum rotational speed, to be set according to the voltage $V_{MIN}$ applied to the MIN terminal.

The inventor has investigated the driving IC 200r shown in FIG. 1, and has come to recognize the following problems.

[Problem 1]

FIGS. 3A through 3C are diagrams showing, for the driving apparatus 9r shown in FIG. 1, the relation between the input duty ratio and the voltage $V_{TH}$ at the TH terminal, the relation between the input duty ratio and the output duty ratio of the output OUT1 (OUT2), and the relation between the input duty ratio and the rotational speed. As shown in FIG. 3A, the voltage $V_{TH}$ at the TH terminal is changed in a linear manner according to the input duty ratio of the input PWM signal. Thus, as shown in FIG. 3B, the duty ratios of the outputs OUT1 and OUT2 (output duty ratios) are changed in a linear manner according to the input duty ratio.

FIG. 3C shows the relation between the input duty ratio and the rotational speed of the fan motor 6. FIG. 3C shows an ideal characteristics curve (i) in an ideal case assuming that the fan motor 6 operates with no load and no power loss. In actuality, as shown in the actual characteristics curve (ii), an actual operation provides low performance as compared with the operation shown in the ideal characteristics curve (i) due to heat generation in the motor coil, friction loss in the bearings, windage loss accompanying the rotation of the rotor, and the effects of heat generation that occurs in various kinds of components of the motor. Such effects increase according to an increase in the rotational speed. With such an arrangement, there is an unavoidable problem in that, as the rotational speed becomes higher, the rotational speed is compressed as the input duty ratio becomes larger.

[Problem 2]

A related technique has been disclosed in Patent document (Japanese Patent Application Laid Open No. 2009-296839). An arrangement is described in this document in which a PWM signal is read out, compensation calculation is performed so as to provide a compensation signal, a compensation value is added or subtracted based on the compensation signal, and the rotational speed of a fan is controlled according to the compensated PWM signal.

In practical use, such a driving IC is combined with various kinds of fan motors. The rotational characteristics of the fan motor shown in FIG. 3C vary according to the kind of fan motor 6, the shape and size of the fan, and the heat-releasing performance of the fan motor 6 and the driving IC 200r. Accordingly, it would be useful to provide a technique for setting the optimum correction characteristics for every situation in which the driving IC 200r is employed.

SUMMARY OF THE INVENTION

An embodiment of the present invention has been made in order to solve the problem 1. Accordingly, it is an exemplary purpose of the present invention to provide a motor driving apparatus having improved linearity of the rotational speed with respect to the control input. Also, another embodiment of the present invention has been made in order to solve the problem 2. Accordingly, it is another exemplary purpose of the present invention to provide a motor driving apparatus that sets the optimum correction characteristics for a situation in which the motor driving apparatus is employed, so as to provide improved linearity of the rotational speed with respect to a rotational speed control signal.

1. An embodiment of the present invention relates to a PWM motor driving apparatus that drives a fan motor. The motor driving apparatus comprises: a rotational speed control terminal coupled to receive an analog control voltage that indicates a rotational speed; a first oscillator terminal arranged such that, in a first platform, a capacitor and a discharging resistor are connected in parallel between the first oscillator terminal and a ground; a charging resistor and a first switch arranged in series between the first oscillator terminal and a reference voltage line via which a stabilized voltage is supplied; a switching circuit that turns off the first switch when an oscillator voltage that occurs at the first oscillator terminal reaches an upper-side threshold value, and that turns on the first switch when the oscillator voltage falls to a lower-side threshold value; a PWM comparator that compares a voltage at the rotational speed control terminal with the oscillator voltage so as to generate a control pulse; and an output circuit that drives the fan motor according to at least the control pulse.

The slope of the oscillator voltage is not configured as a straight line, but rather is configured as a slope having a curvature that is changed according to the CR time constant. This provides improved linearity in the relation between the voltage at the rotational speed control terminal and the output duty ratio. In addition, by adjusting the charging resistor and the discharging resistor, such an arrangement is capable of determining the slope of the charging ratio, the slope of the discharging ratio, and the frequency of the oscillator voltage.

With such an embodiment, the motor driving apparatus may further comprise a second oscillator terminal. Also, in the first platform, the charging resistor may be connected as an external component between the second oscillator terminal and the first oscillator terminal. Also, the first switch may be arranged between the second oscillator terminal and the reference voltage line.

With such an embodiment, the switching circuit may comprise: a first resistor, a second resistor, and a third resistor that are sequentially connected in series between the output of the reference voltage source and the ground; a second switch arranged in parallel with the third resistor; and a comparator that compares a voltage at a connection node that connects the first resistor and the second resistor with the oscillator voltage. Also, the on/off operation of each of the first switch and the second switch may be controlled according to an output of the comparator.

With such an embodiment, the motor driving apparatus may further comprise: a first current source that sources a predetermined charging current to the oscillator terminal in an enable state; and a second current source that sinks a predetermined discharging current from the oscillator terminal in the enable state. Also, at least one from among the first current source and the second current source may be configured such that the switching circuit is able to perform an on/off control operation thereof. Also, the switching circuit may be switchable between (i) a first mode in which the first current source and the second current source are each set to a disable state, and an on/off operation of the first switch is controlled, and (ii) a second mode in which the first switch is turned off, the first current source and the second current source are each set to an enable state, and an on/off operation of at least one from among the first current source and the second current source is controlled.

By selecting the second mode in which the first current source and the second current source are each set to the enable state, such an arrangement is capable of providing the oscillator voltage having a straight slope. Thus, such a motor driving apparatus supports conventional platforms.

With such an embodiment, the motor driving apparatus may further comprise: a first current source that sources a predetermined charging current to the oscillator terminal in an enable state; and a second current source that sinks a predetermined discharging current from the oscillator terminal in the enable state. Also, the switching circuit may be switchable between a first mode in which the first current source and the second current source are each set to a disable state, and the on/off operation of the first switch is controlled, and a second mode in which the first switch is turned off, and the on/off operation of the second current source is controlled.

With such an embodiment, the switching circuit may comprise: a first resistor, a second resistor, and a third resistor that are sequentially connected in series between the output of the reference voltage source and the ground; a second switch arranged in parallel with the third resistor; and a comparator that compares a voltage at a connection node that connects the first resistor and the second resistor with the oscillator voltage. Also, (i) in the first mode, the on/off operation of each of the first switch and the second switch may be controlled according to an output of the comparator. Also, (ii) in the second mode, the on/off operation of each of the second current source and the second switch may be controlled according to the output of the comparator.

With such an embodiment, the motor driving apparatus may further comprise a selector terminal for receiving a selection signal which indicates the selection between the first mode and the second mode.

With such an embodiment, the motor driving apparatus may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the circuit as a single IC, such an arrangement allows the circuit area to be reduced, and allows the circuit elements to have uniform characteristics.

Also, an input pulse modulation signal may be input to the rotational speed control terminal via a filter.

Another embodiment of the present invention relates to a cooling apparatus. The cooling apparatus comprises: a fan motor; and any one of the aforementioned motor driving apparatuses that drive the fan motor.

Yet another embodiment of the present invention relates to a PWM motor driving IC (Integrated Circuit) that drives a fan motor. The motor driving IC comprises: a rotational speed control terminal via which an analog control voltage that indicates a rotational speed is received; a first oscillator terminal arranged such that, in a first platform, a capacitor and a discharging resistor each configured as an external component are connected in parallel between the first oscillator terminal and a ground; a second oscillator terminal arranged such that, in the first platform, a charging resistor configured as an external component is connected between the second oscillator terminal and the first oscillator terminal; a first switch arranged between the first oscillator terminal and a reference voltage line via which a stabilized voltage is supplied; a switching circuit that turns off the first switch when an oscillator voltage that occurs at the first oscillator terminal reaches an upper-side threshold value, and that turns on the first switch when the oscillator voltage falls to a lower-side threshold value; a PWM comparator that compares a voltage at the rotational speed control terminal with the oscillator voltage, so as to generate a control pulse; and an output circuit that drives the fan motor according to at least the control pulse.

With such an embodiment, the motor driving IC may further comprise: a first current source that sources a predetermined charging current to the oscillator terminal in an enable state; and a second current source that sinks a predetermined discharging current from the oscillator terminal in the enable state. Also, the switching circuit may be switchable between (i) a first mode in which the first current source and the second current source are each set to a disable state, and an on/off operation of the first switch is controlled, and (ii) a second mode in which the first switch is turned off, the first current source and the second current source are each set to an enable state, and an on/off operation of the second current source is controlled.

2. Yet another embodiment of the present invention relates to a PWM motor driving circuit that drives a fan motor. The motor driving circuit comprises: a rotational speed control input unit that receives, as its input signal, a rotational speed control signal which indicates a rotational speed to be set for the fan motor; a first setting input unit that receives first information which indicates a first parameter $\alpha$; a digital pulse width modulator that generates a control pulse having an output duty ratio based on the rotational speed control signal and a correction function $y=f(x)$ defined so as to have a curve that protrudes downward with a degree of curvature that can be adjusted based on the first parameter $\alpha$; and an output circuit that drives the fan motor according to at least the control pulse.

With such an embodiment, by supplying the first parameter $\alpha$ according to an environment in which the motor driving circuit is employed, such an arrangement provides the optimum correction characteristics. This provides improved linearity in the relation between the rotational speed and the rotational speed control signal.

With a value that corresponds to a minimum value of the rotational speed control signal as $x_0$, and with a value that corresponds to a maximum value of the rotational speed control signal as $x_{100}$, the correction function $y=f(x)$ may be defined based on a straight line function represented by $y=ax$, so as to satisfy $f(x_0)=ax_0$, and $f(x_{100})=ax_{100}$.

Also, the first information may be input as an analog voltage to the first setting input unit.

Also, the first information may be input as digital data to the first setting input unit. Also, the first setting input unit may comprise first memory that holds the first information.

Also, the first setting input unit may comprise an I²C (Inter IC) bus interface circuit that receives the first information configured as digital data.

With such an embodiment, the motor driving circuit may further comprise a second setting input unit that receives second information which indicates a second parameter β. Also, the second parameter β may determine a.

Yet another embodiment of the present invention also relates to a motor driving circuit. The motor driving circuit comprises: a rotational speed control terminal that receives a rotational speed control signal which indicates a rotational speed to be set for the fan motor; an input circuit that converts the rotational speed control signal into an input digital value x; a first setting terminal that receives first information which indicates a first parameter α; a duty calculation unit that calculates a duty instruction value y that corresponds to the input digital value x based on a correction function $y=f(x)$ defined based on a straight line function represented by $y=ax$ such that the correction function $y=f(x)$ has a curve protruding downward with a degree of curvature that can be adjusted according to the first parameter α, and such that, with an input digital value that corresponds to a minimum value of the rotational speed control signal as $x_0$, and with an input digital value that corresponds to a maximum value of the rotational speed control signal as $x_{100}$, the correction function $y=f(x)$ satisfies $f(x_0)=ax_0$ and $f(x_{100})=ax_{100}$; a digital pulse width modulator that generates a control pulse having an output duty ratio that corresponds to the duty instruction value y; and an output circuit that drives the fan motor according to at least the control pulse.

With such an embodiment, by supplying the first parameter α according to an environment in which the motor driving circuit is employed, such an arrangement provides the optimum correction characteristics. This provides improved linearity in the relation between the rotational speed and the rotational speed control signal.

With such an embodiment, with the input digital value that provides a maximum difference between ax and $f(x)$ as $x_C$, the first parameter α may determine a difference between $ax_C$ and $f(x_C)$.

With such an embodiment, $x_C$ may be set to a value that corresponds to the input duty ratio ranging between 33% through 66%. Also, $x_C$ may be set to a value that corresponds to the input duty ratio of 50%.

With such an embodiment, the first information may be input as an analog voltage to the first setting terminal. Also, the motor driving circuit may further comprise a first A/D converter that converts the analog voltage input to the first setting terminal into the first parameter α.

With such an embodiment, the motor driving circuit may further comprise a second setting terminal that receives second information which indicates a second parameter β. Also, the second parameter β may determine a.

With such an embodiment, the second information may be input as an analog voltage to the second setting terminal. Also, the motor driving circuit may further comprise a second A/D converter that converts the analog voltage input to the second setting terminal into the second parameter β configured as digital data.

With such an embodiment, the first information may be input to the first setting terminal in the form of digital data. Also, the motor driving circuit may further comprise: an interface circuit that receives digital data input to the first setting terminal, and acquires the first parameter α; and first memory that holds the first parameter α.

With such an embodiment, the second information may be input to the second setting terminal in the form of digital data. Also, the motor driving circuit may further comprise: an interface circuit that receives digital data input to the second setting terminal, and acquires the second parameter β; and second memory that holds the second parameter β.

With such an embodiment, the motor driving circuit may further comprise a third setting terminal that receives third information which indicates a third parameter γ. Also, the duty calculation unit may use the third parameter γ as a lower limit to clamp the duty instruction value γ.

With such an embodiment, the rotational speed control terminal may receive, as the rotational speed control signal, an input pulse modulation signal having an input duty ratio. Also, the input circuit may comprise a duty ratio/digital converter that receives the input pulse modulation signal, and converts the input pulse modulation signal thus received into an input digital value x that corresponds to the input duty ratio.

Also, the motor driving circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit as a single IC, such an arrangement allows the circuit area to be reduced, and allows the circuit elements to have uniform characteristics.

Yet another embodiment of the present invention relates to a cooling apparatus. The cooling apparatus comprises: a fan motor; and the aforementioned motor driving IC that drives the fan motor.

Yet another embodiment of the present invention relates to an electronic device. The electronic device may comprise: a processor; and the aforementioned cooling apparatus that cools the processor.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is an operation waveform diagram showing the operation of the driving apparatus shown in FIG. 4;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 4:
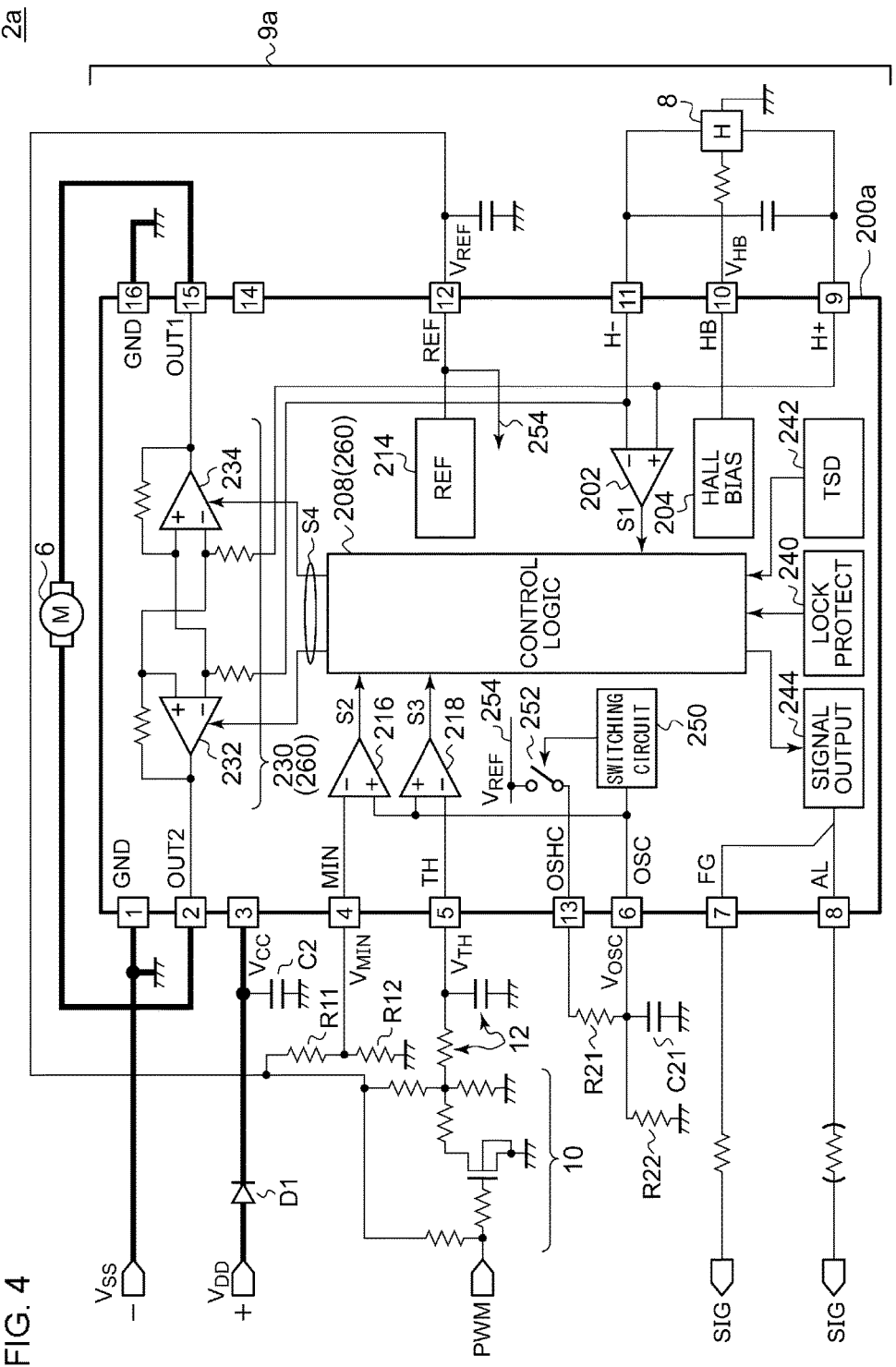
FIG. 4 is a circuit diagram showing a configuration of a cooling apparatus including a driving IC according to a first embodiment.

FIG. 4 is a circuit diagram showing a configuration of a cooling apparatus 2a including a driving IC 200a according to a first embodiment. A cooling apparatus 2a is mounted on a desktop computer, laptop computer, workstation, game machine, audio device, video device, or the like. The cooling apparatus 2a cools a cooling target (not shown) such as a CPU (Central Processing Unit), GPU (Graphics Processing Unit), power supply apparatus, or the like. The cooling apparatus 2a includes a fan motor 6 arranged such that it faces the cooling target, and a driving apparatus 9a that drives the fan motor 6.

The driving apparatus 9a is configured including the driving IC 200a according to the present embodiment and its peripheral components. Description will be made below focusing on the point of difference in the configuration between the driving apparatus 9a and the driving apparatus 9 shown in FIG. 1. The driving IC 200a is configured as a function IC integrated on a single semiconductor substrate.

The rotational speed control terminal (TH) receives, as its input signal, an analog control voltage $V_{TH}$ which indicates the rotational speed to be set for the fan motor 6. In this platform, an input pulse modulation signal PWM having an input duty ratio is input to the TH terminal via an inverter 10 and an RC filter 12. In another platform, an analog voltage generated by a thermistor or the like may be input to the TH terminal.

A capacitor C21 and a discharging resistor R22 are arranged as external components connected in parallel between the first oscillator terminal (OSC) configured as the sixth pin and the ground. Furthermore, a charging resistor R21 is arranged as an external component between a second oscillator terminal (OSCH) configured as the thirteenth pin and the OSC terminal.

Figure 1:
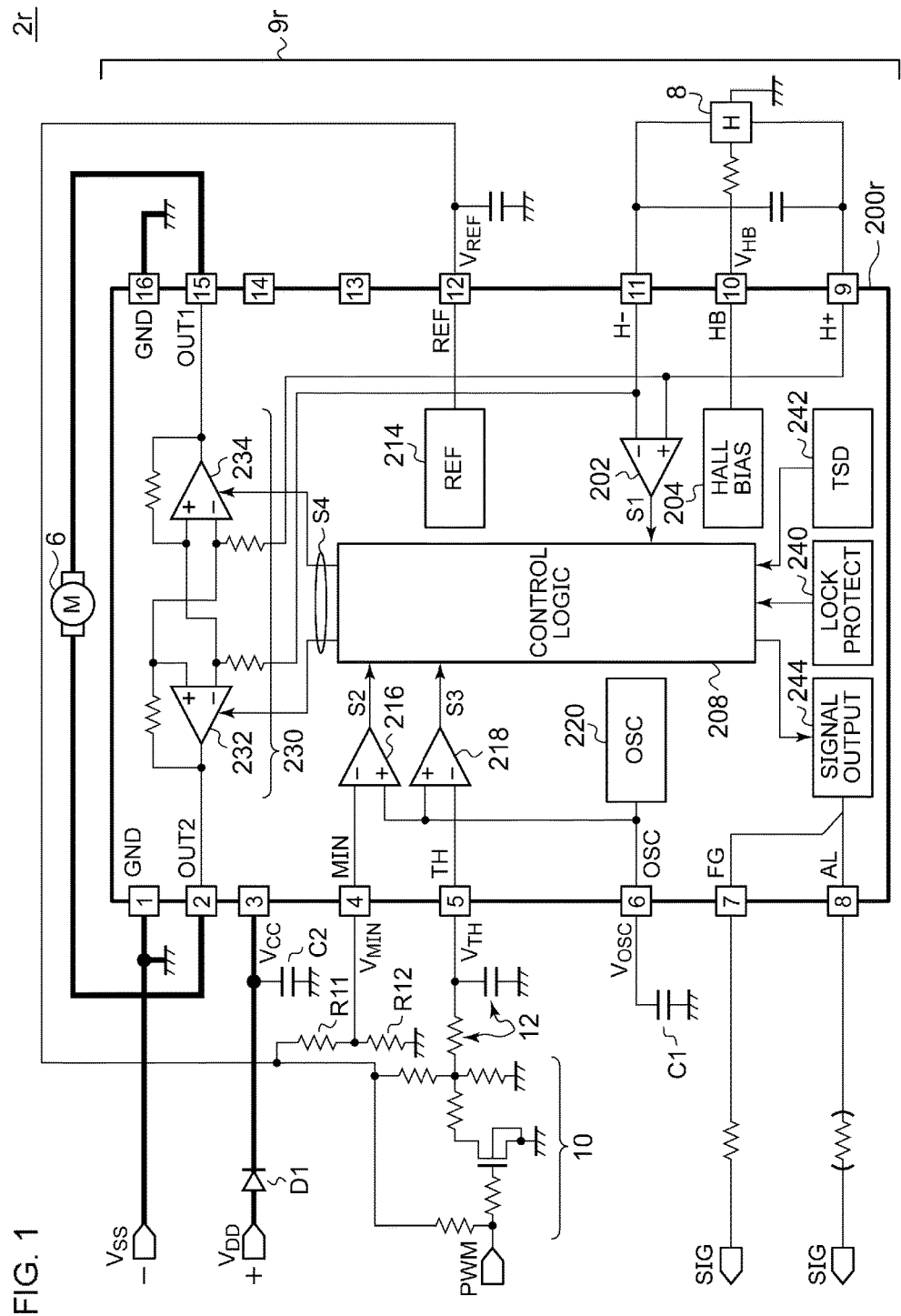
FIG. 1 is a circuit diagram showing a cooling apparatus including a fan motor driving IC investigated by the present inventors.
Figure 2:
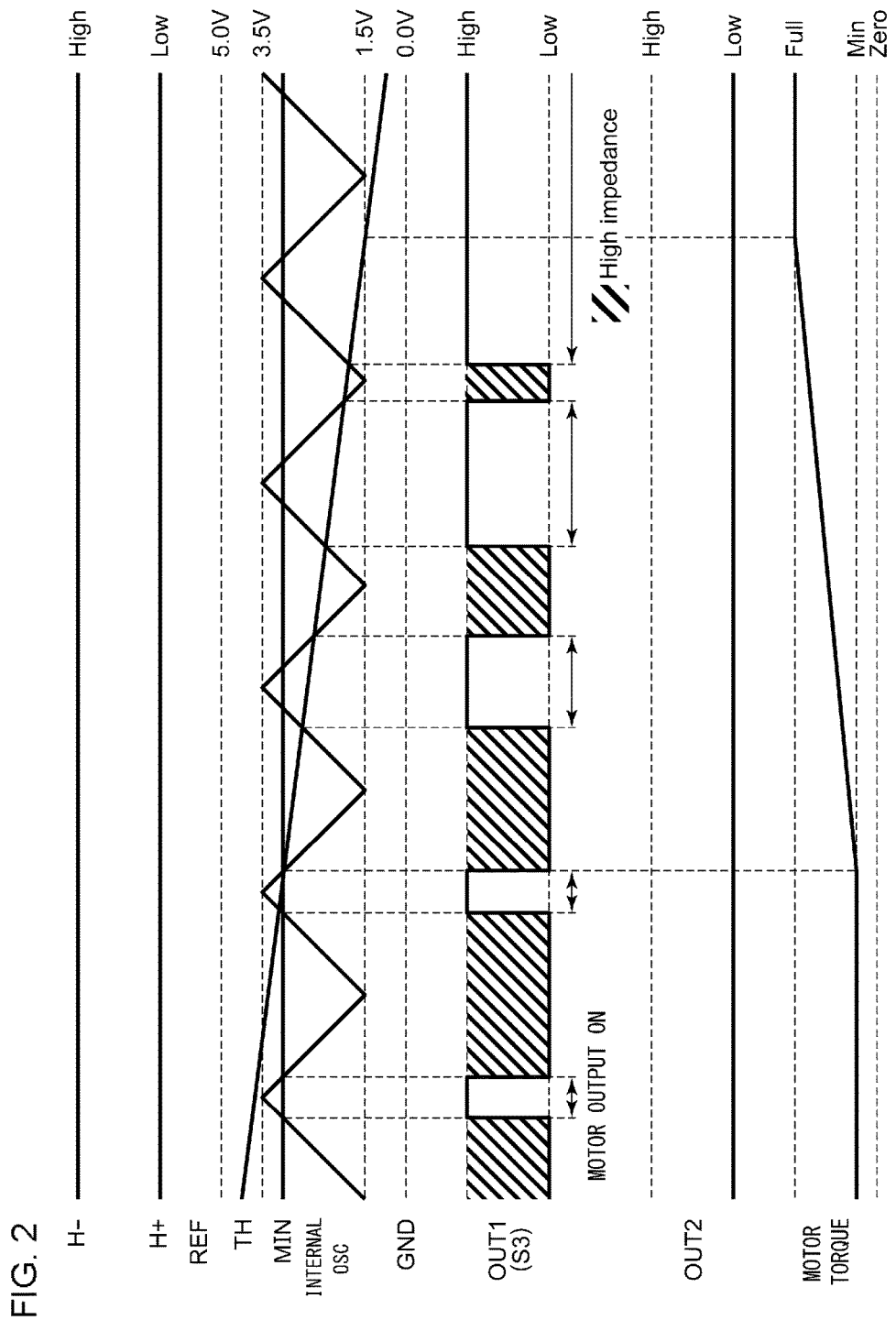
FIG. 2 is an operation waveform diagram showing the operation of the driving IC shown in FIG. 1.

Instead of the oscillator 220 shown in FIG. 1, the driving IC 200a includes a switching circuit 250 and a first switch 252. As described above with reference to FIG. 1, the reference voltage source 214 generates the reference voltage $V_{REF}$. The reference voltage line 254 is connected to the output of the reference voltage source 214 so as to stabilize the voltage at the reference voltage line 254. The reference voltage $V_{REF}$ is supplied via the reference voltage line 254 to each internal block included within the driving IC 200a.

The first switch 252 is arranged between the reference voltage line 254 and the OSCH terminal. That is to say, the first switch 252 and the charging resistor R21 are arranged in series between the reference voltage line 254 and the OSC terminal.

When the oscillator voltage $V_{OSC}$ that occurs at the OSC terminal reaches a predetermined upper-side threshold value $V_H$ (e.g., 3.5 V), the switching circuit 250 turns off the first switch 252. When the oscillator voltage $V_{OSC}$ falls to a lower-side threshold value $V_L$ (e.g., 1.5 V), the switching circuit 250 turns on the first switch 252.

The PWM comparator 218 compares the voltage $V_{TH}$ at the TH terminal with the oscillator voltage $V_{OSC}$, and generates the control pulse S3.

The control logic circuit 208 and the driving stage 230 form an output circuit 260 that drives the fan motor 6 according to at least a control pulse S8. The control logic circuit 208 and the driving stage 230 are each configured in the same manner as described above with reference to FIG. 1.

The present invention encompasses various kinds of apparatuses and circuits that can be regarded as a block configuration or a circuit configuration shown in FIG. 4, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Figure 5:
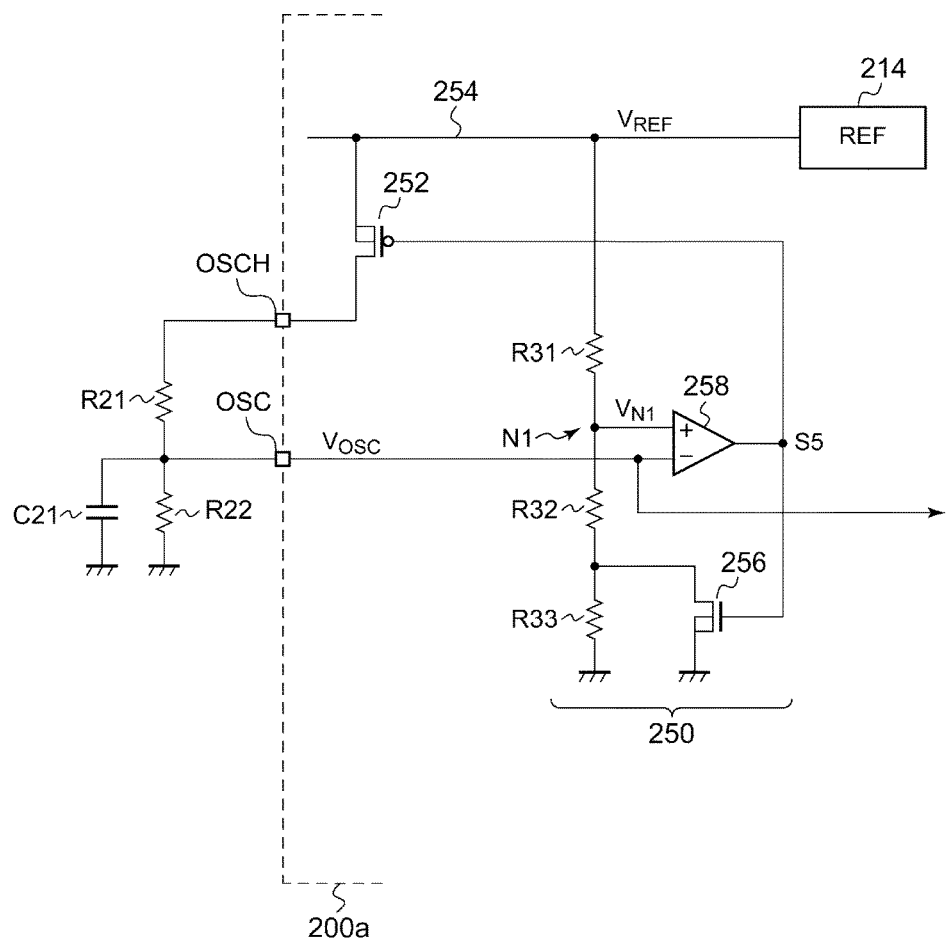
FIG. 5 is a circuit diagram showing an example configuration of a switching circuit.

FIG. 5 is a circuit diagram showing an example configuration of the switching circuit 250. A first resistor R31, a second resistor R32, and a third resistor R33 are sequentially connected in series between the reference voltage line 254 and the ground. The second switch 256 is configured as an N-channel MOSFET (Metal Oxide Semiconductor Field Effect Transistor), and arranged in parallel with the third resistor R33. The second switch 256 may be configured as an NPN bipolar transistor.

A comparator 258 compares a voltage $V_{N1}$ at a connection node N1 that connects the first resistor R31 and the second resistor R32 with the oscillator voltage $V_{OSC}$. The first switch 252 and the second switch 256 are controlled according to an output S5 of the comparator 258 such that they are turned on and off in a complementary manner.

Specifically, when $V_{N1} > V_{OSC}$, the output S5 of the comparator 258 is set to the high level. Conversely, when $V_{N1} < V_{OSC}$, the output S5 is set to the low level. When the output S5 is set to the high level, the first switch 252 is turned off, and the second switch 256 is turned on, which provides a discharging state.

In the discharging state, the capacitor C21 is discharged via the discharging resistor R22, which provides a falling slope period of the oscillator voltage $V_{OSC}$. In the discharging state, the second switch 256 is turned on, which short-circuits the third resistor R33. In this state, the voltage $V_{N1}$ is set to a voltage represented by $V_{N1} = V_{REF} \times R32/(R31+R32)$, which corresponds to the lower-side threshold value $V_L$.

When the output S5 is set to the low level, the first switch 252 is turned on, and the second switch 256 is turned off, which provides a charging state. In the charging state, the capacitor C21 is charged via the charging resistor R21, which provides a rising slope period of the oscillator voltage $V_{OSC}$. In the charging state, the second switch 256 is turned off. In this state, the voltage $V_{N1}$ is set to a voltage represented by $V_{N1} = V_{REF} \times (R32+R33)/(R31+R32+R33)$, which corresponds to the upper-side threshold value $V_H$.

It should be noted that the switching circuit 250 can be regarded as a hysteresis comparator. That is to say, instead of such a configuration shown in FIG. 5, the switching circuit 250 may be configured employing a known hysteresis comparator. Alternatively, the switching circuit 250 may be configured employing dedicated comparators having respective threshold voltages $V_H$ and $V_L$.

The above is the configuration of the driving IC 200a. Next, description will be made regarding the operation of the driving IC 200a.

FIG. 6 is an operation waveform diagram showing the operation of the driving apparatus 9a shown in FIG. 4. In the charging period in which the first switch 252 is turned on, the capacitor C21 is charged via the charging resistor R21, and the oscillator voltage $V_{OSC}$ at the OSC terminal rises with a large slope. When the oscillator voltage $V_{OSC}$ reaches the upper-side threshold voltage $V_H$, the first switch 252 is turned off. In this state, the capacitor C21 is gradually discharged via the discharging resistor R22. Subsequently, when the oscillator voltage $V_{OSC}$ falls to the lower-side threshold value $V_L$, the first switch 252 turns on. Such an operation is repeatedly performed, which generates the oscillator voltage $V_{OSC}$ having a sawtooth waveform having a non-linear rising slope and falling slope as shown in FIG. 6.

Figure 7A:
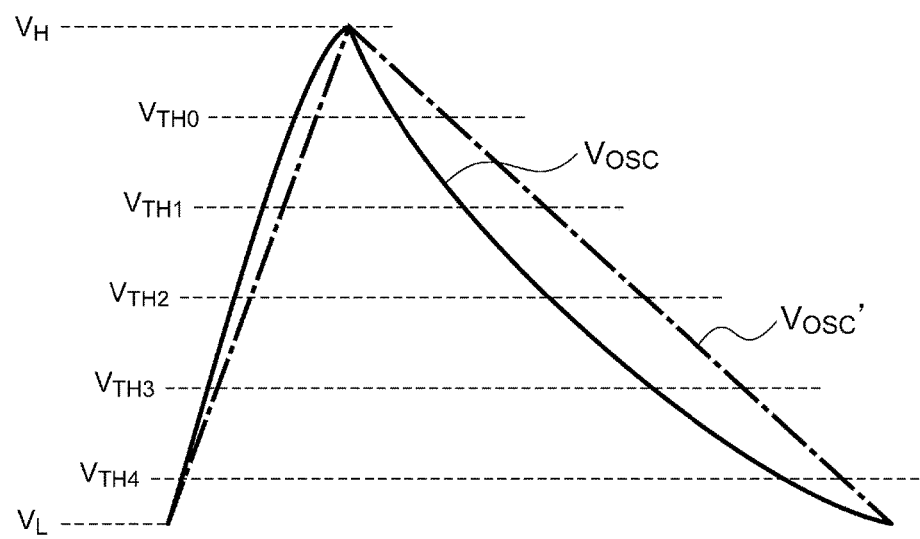
FIG. 7A is a waveform diagram showing the oscillator voltage $V_{OSC}'$ shown in FIG. 1 and the oscillator voltage $V_{OSC}$ shown in FIG. 4.
Figure 7B:
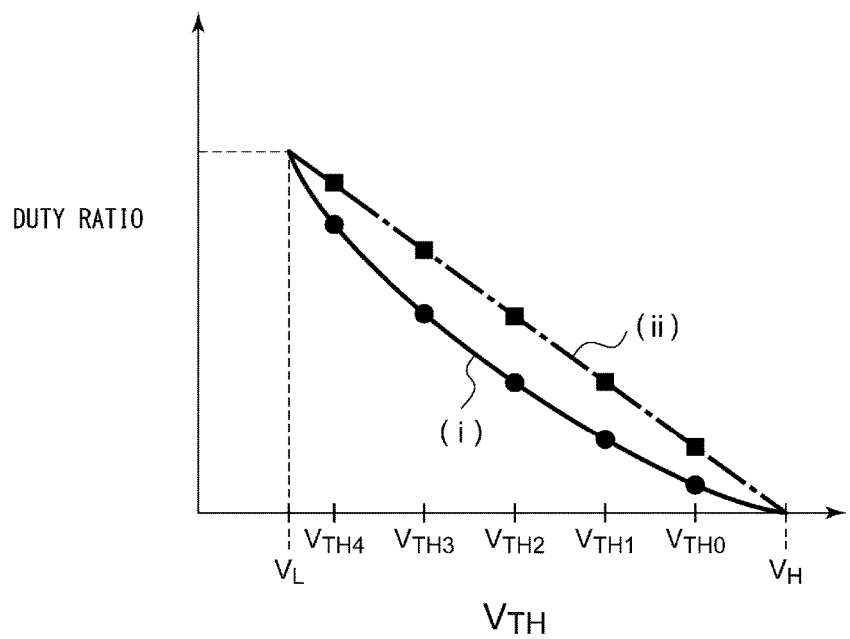
FIG. 7B is a diagram showing the relation between the voltage at the TH terminal and the duty ratio of the control pulse.

In a case in which such a non-linear sawtooth waveform is compared with the voltage $V_{TH}$, such an arrangement provides the control pulse S3 having a duty ratio that is changed in a non-linear manner according to the voltage level of the voltage $V_{TH}$. FIG. 7A is a waveform diagram showing the oscillator voltage $V_{OSC}'$ provided by an arrangement shown in FIG. 1 and the oscillator voltage $V_{OSC}$ provided by an arrangement shown in FIG. 4. Here, the oscillator voltage $V_{OSC}'$ provided by an arrangement shown in FIG. 1 and the oscillator voltage $V_{OSC}$ provided by an arrangement shown in FIG. 4 are shown with rising slopes that match each other for ease of comparison. FIG. 7B is a diagram showing the relation between the voltage $V_{TH}$ at the TH terminal and the duty ratio of the control pulse S3. In this drawing, (i) represents the characteristics of the driving IC 200a shown in FIG. 4, and (ii) represents the characteristics of the driving IC 200r shown in FIG. 1. As can be clearly understood from FIG. 7B, with the driving IC 200a shown in FIG. 4, the control pulse S3 is changed so as to have a non-linear curve with respect to the voltage $V_{TH}$. By employing such non-linear curve characteristics (which will be referred to as the "correction characteristics"), such an arrangement is capable of correcting the relation between the input duty ratio and the rotational speed. Thus, such an arrangement allows the corrected characteristics to approach the target characteristics (iii) shown in FIG. 3C.

Figure 8:
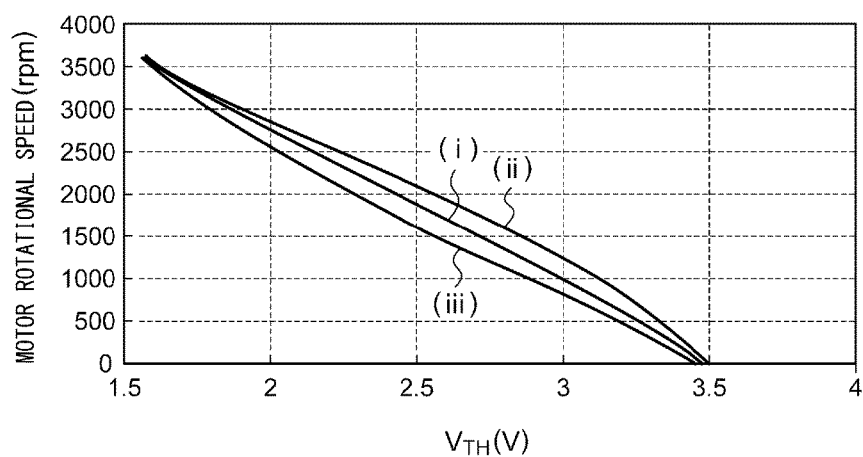
FIG. 8 is a diagram showing the control characteristics for various combinations of the charging resistor and the discharging resistor.

FIG. 8 is a diagram showing the control characteristics obtained for various combinations of the charging resistor R21 and the discharging resistor R22. Here, the capacitor C21 is configured to have a capacitance of 100 pF.

(i) R21=10 kΩ, R22=100 kΩ
(ii) R21=10 kΩ, R22=10 kΩ
(iii) R21=10 kΩ, R22=100 kΩ/470 kΩ

Here, "100 kΩ/470 kΩ" represents a parallel connection of 100-kΩ and 470-kΩ resistors. In this example, the combination (i) provides characteristics that are nearest to the target characteristics.

Figure 3A:
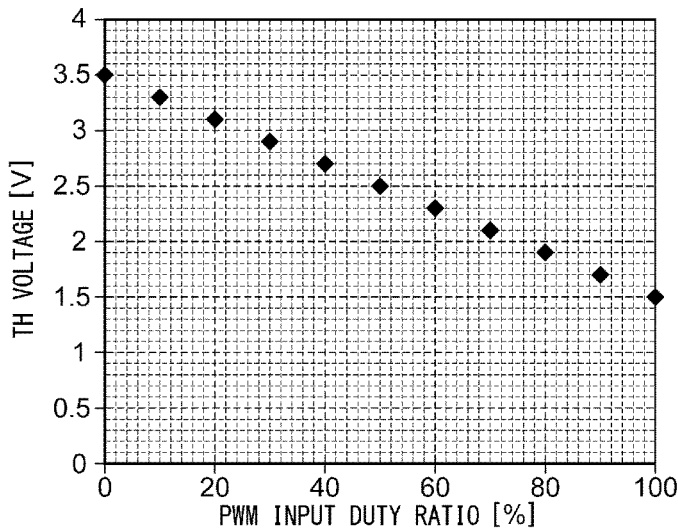
FIGS. 3A through 3C are diagrams respectively showing the relation between the input duty ratio and the voltage at the TH terminal, the relation between the input duty ratio and the output duty ratio at the output OUT1 (OUT2), and the relation between the input duty ratio and the rotational speed.
Figure 3B:
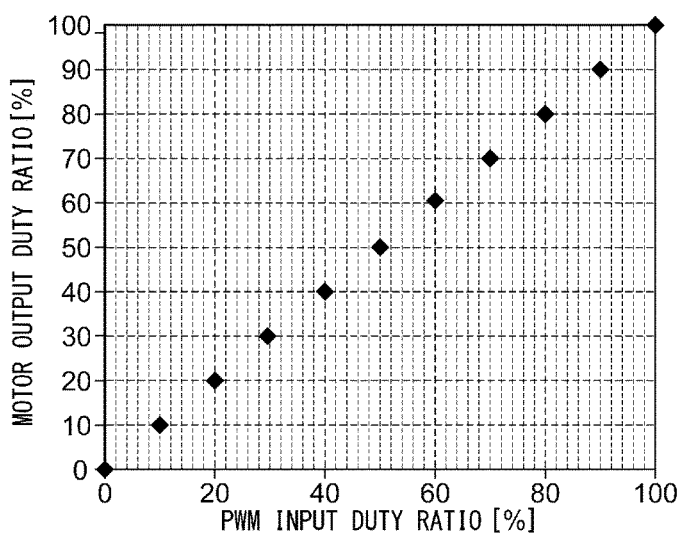
Figure 3C:
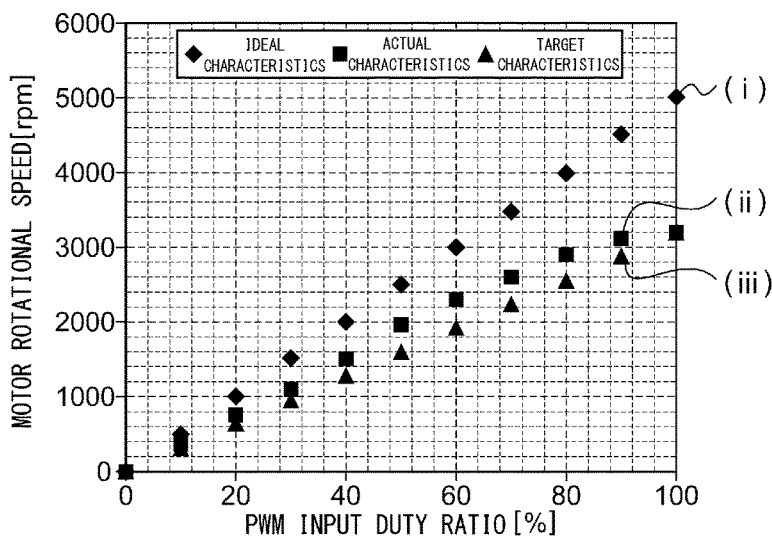

The actual characteristics shown in FIG. 3C vary according to the kind of fan motor 6, the shape and size of the fan, and the heat-releasing performance of the fan motor 6 and the driving IC 200. With the driving IC 200a according to the embodiment, as shown in FIG. 8, the control characteristics curve can be changed by adjusting the combination of the charging resistor R21 and the discharging resistor R22. Thus, by selecting the optimum combination of the charging resistor R21 and the discharging resistor R22, such an arrangement allows the control characteristics to approach the target characteristics.

As described above, with the driving IC 200a according to the embodiment, such an arrangement provides improved linearity of the rotational speed with respect to the control input $V_{TH}$ (i.e., duty ratio of the PWM input signal).

Second Embodiment

Figure 9:
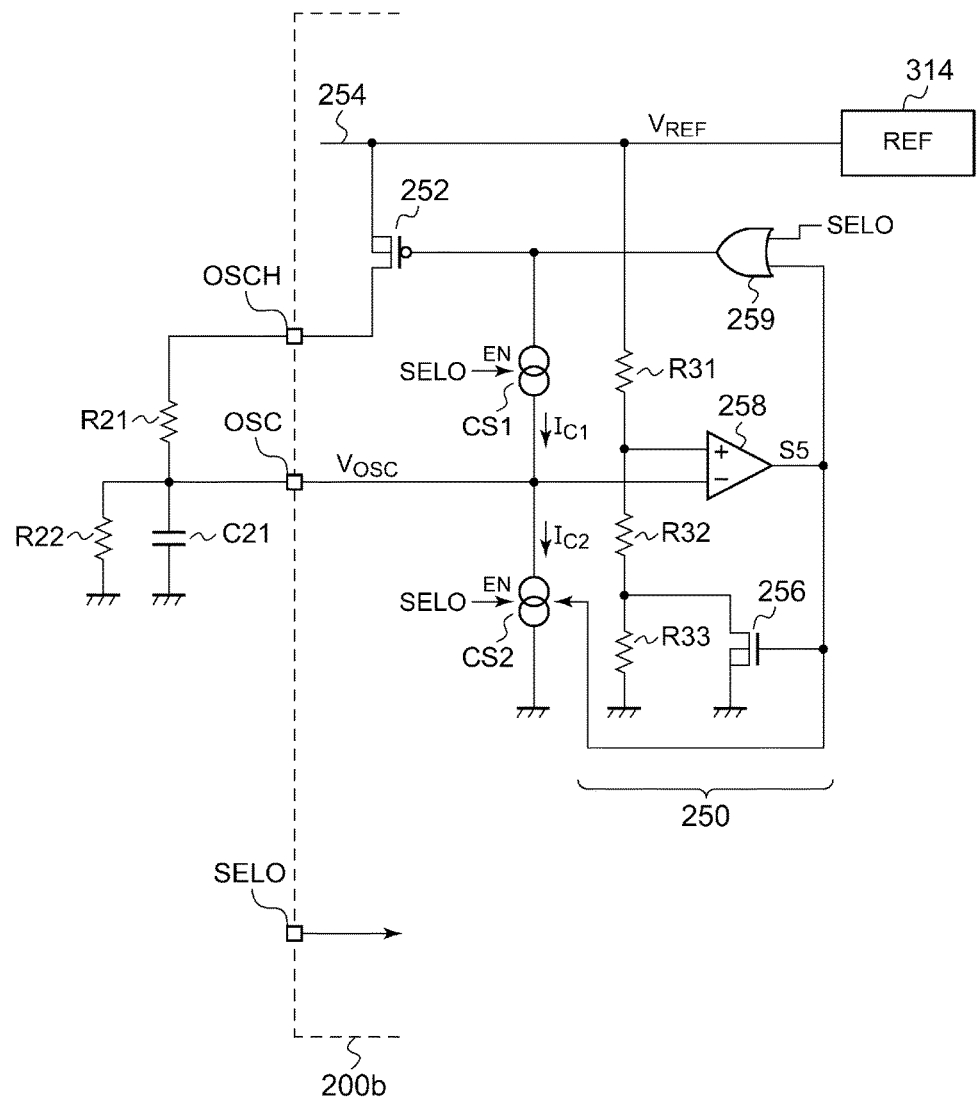
FIG. 9 is a circuit diagram showing a driving IC according to a second embodiment.

FIG. 9 is a circuit diagram showing a driving IC 200b according to a second embodiment. The driving IC 200b further includes a first current source CS1, a second current source CS2, and a logic gate 259, in addition to the components of the driving IC 200a shown in FIG. 4.

The first current source CS1 and the second current source CS2 are each configured to switch between an enable state and a disable state. In the enable state, the first current source CS1 sources a predetermined amount of charging current $I_{C1}$ to the OSC terminal. Furthermore, in the enable state, the second current source CS2 sinks a predetermined amount of discharging current $I_{C2}$ from the OSC terminal.

In addition to the switching between the enable state and the disable state, at least one of the first current source CS1 and the second current source CS2 is configured to allow the switching circuit 250 to switch the state of the current source between the on state and the off state. FIG. 9 shows an arrangement in which only the second current source CS2 can be controlled according to the output S5 of the comparator 258 such that it switches between the on state and the off state.

The driving IC 200b includes a selector terminal (SELO) which is used in order to set the oscillator mode. The SELO terminal receives, as its input signal, a high level voltage or otherwise a low level voltage. When the voltage input to the SELO terminal matches a first level (e.g., high level), the first current source CS1 and the second current source CS2 are each set to the enable state. When the voltage input to the SELO terminal matches a second level (e.g., low level), the first current source CS1 and the second current source CS2 are each set to the disable state. Instead of providing such a SELO terminal, such a mode setting signal may be input via an interface such as an I²C bus or the like. Alternatively, nonvolatile memory may be built into the driving IC 200b, and the mode may be selected based on the data stored in the nonvolatile memory.

The logic gate 259 is provided in order to turn off the first switch 252. When the first level (high level) signal is input to the SELO terminal, the logic gate 259 fixedly sets the first switch 252 to the off state. Furthermore, when the second level (low level) signal is input to the SELO terminal, the logic gate 259 allows the output S5 of the comparator 258 to pass through, which switches the first switch 252 between the on state and the off state. It should be noted that, for ease of understanding, the logic gate 259 is represented by a symbol for an OR gate. However, such an actual configuration is not restricted to such an OR gate. Also, other kinds of configurations having the same functions may be employed.

The above is the configuration of the driving IC 200b.

The driving IC 200b can be operated in either the first mode or the second mode, which can be switched according to the platform employed. When the low level signal is input to the SELO terminal, the first mode is selected. In the first mode, the first current source CS1 and the second current source CS2 are each set to the disable state. In this mode, the driving IC 200b operates in the same manner as in the first embodiment.

When the high level signal is input to the SELO terminal, the second mode is selected. In the second mode, the first switch 252 is fixed to the off state. Furthermore, the first current source CS1 and the second current source CS2 are each enabled. In the case of a platform for which the second mode is selected, the charging resistor R21 and the discharging resistor R22 are not required. With such an arrangement, when the second current source CS2 is turned on according to the output S5 of the comparator 258, the capacitor C21 is discharged using a current having a current value represented by $I_{c2}-I_{C1}$. Conversely, when the second current source CS2 is turned off, the capacitor C21 is charged using the current $I_{C1}$. In the second mode, the oscillator voltage $V_{OSC}$ is configured to have a triangle waveform. Thus, such an arrangement allows the driving IC 200b to perform the same operation as with the driving IC 200r shown in FIG. 1. In a case of employing the second mode, such an arrangement does not require the charging resistor R21 and the discharging resistor R22, which allows the number of circuit components to be reduced.

[Usage]

Figure 10:
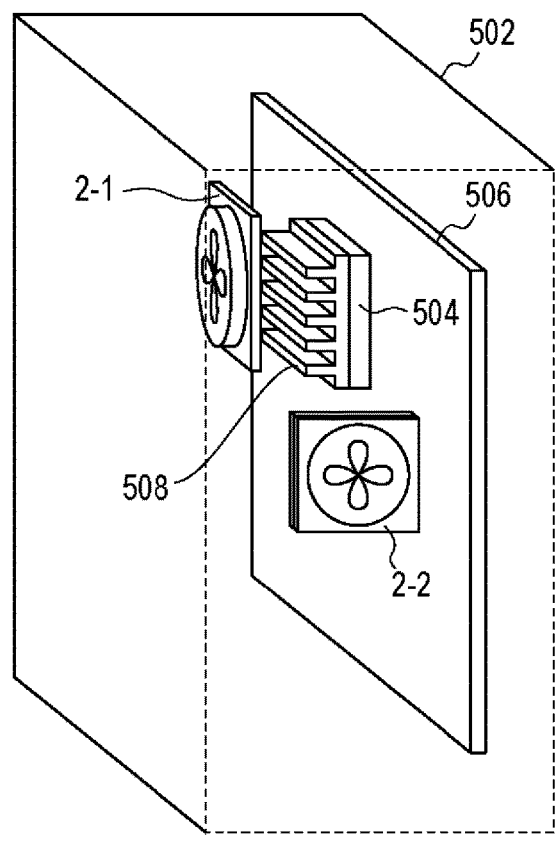
FIG. 10 is a perspective view of a PC including a cooling apparatus.

Lastly, description will be made regarding the usage of the cooling apparatus 2. FIG. 10 is a perspective view of a PC including such cooling apparatuses 2. A PC 500 includes a housing 502, a CPU 504, a motherboard 506, a heat sink 508, and multiple cooling apparatuses 2.

The CPU 504 is mounted on the motherboard 506. The heat sink 508 is arranged such that it is in contact with the top face of the CPU 504. The cooling apparatus 2_1 is arranged such that it faces the heat sink 508, so as to blow air onto the heat sink 508. The cooling apparatus 2_2 is arranged on the back face of the housing 502, so as to supply external air to the inner portion of the housing 502.

In addition to the PC 500 shown in FIG. 10, the cooling apparatus 2 can be mounted on various kinds of electronic devices, examples of which include workstations, laptop PCs, TVs, refrigerators, and the like.

Description has been made above regarding the first and second embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications relating to the first or second embodiment.

First Modification

Figure 11C:
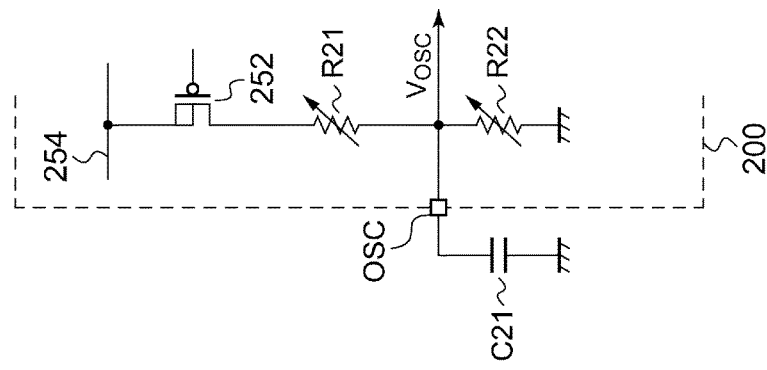
FIGS. 11A through 11C are circuit diagrams each showing a driving IC according to a first modification.
Figure 11B:
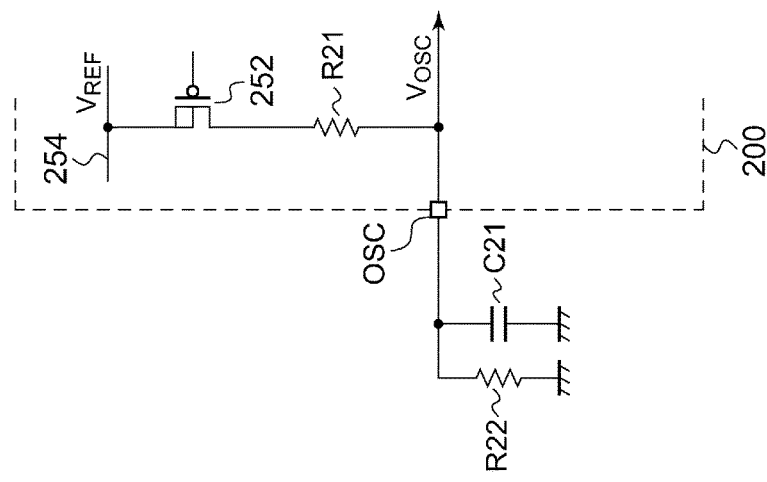
Figure 11A:
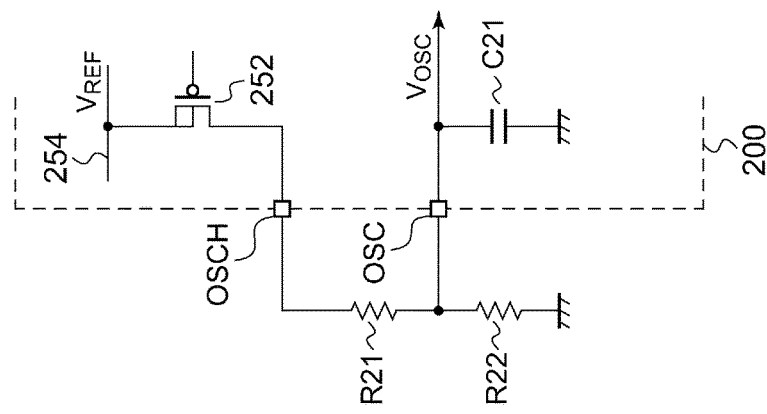

All the elements that form the driving IC 200 may be monolithically integrated. Also, the driving IC 200 comprising such elements may be configured in the form of multiple separate integrated circuits. Also, a part of the driving IC 200 may be configured as a discrete component. Such an integrated part may preferably be determined based on costs, occupied area, usage, and the like. Conversely, a part of external circuit elements connected to the driving IC 200 according to the embodiment may be integrated on the driving IC 200. FIGS. 11A through 11C are circuit diagrams each showing the driving IC 200 according to a first modification. FIG. 11A shows an arrangement in which the capacitor C21 is integrated on the driving IC 200. Such an arrangement requires no external capacitor, which allows its costs and mounting area to be reduced.

FIG. 11B shows an arrangement in which the charging resistor R21 is integrated on the driving IC 200. Such an arrangement allows the number of external resistors to be reduced by one, thereby providing reduced costs and a reduced mounting area. Furthermore, such an arrangement does not require the OSCH terminal. Thus, in some cases, such an arrangement allows the chip size of the driving IC 200 to be reduced.

FIG. 11C shows an arrangement in which both the charging resistor R21 and the discharging resistor R22 are integrated on the driving IC 200. Such an arrangement allows the number of external resistors to be reduced by one, thereby providing reduced costs and a reduced mounting area. Furthermore, such an arrangement does not require the OSCH terminal. Thus, in some cases, such an arrangement allows the chip size of the driving IC 200 to be reduced. In such an arrangement shown in FIG. 11C, at least one of the resistors is preferably configured as a variable resistor, or preferably both of them are thus configured. This allows fine adjustment of the correction characteristics to be performed for every platform.

Second Modification

Description has been made in the embodiments regarding an arrangement in which R21<R22, which provides the falling slope period of the oscillator voltage $V_{OSC}$ as the longer period. Also, an arrangement may be made in which R21>R22, which provides the rising slope period of the oscillator voltage $V_{OSC}$ as the longer period. In this case, preferably, the control pulse S3 may be logically inverted. Alternatively, the voltage $V_{TH}$ to be applied to the TH terminal may preferably be configured to have an inverted polarity.

Third Modification

Description has been made in the embodiments regarding an arrangement in which the fan motor to be driven is configured as a single-phase driving motor. However, the present invention is not restricted to such an arrangement. Rather, the present invention is applicable to the driving operation of other kinds of motors.

Fourth Modification

The configuration of the driving stage 230 and the driving method are not restricted to those described in the embodiments. Description has been made regarding an arrangement in which the amplitude (envelope line) of each of the output voltages output from the OUT1 terminal and the OUT2 terminal is changed according to the Hall signals H+ and H−. Also, the amplitude may be maintained at a constant level.

Fifth Modification

The polarity and the logical level of each signal have been described in the present embodiments for exemplary purposes only. Such settings may be inverted as desired.

Third Embodiment

Figure 12:
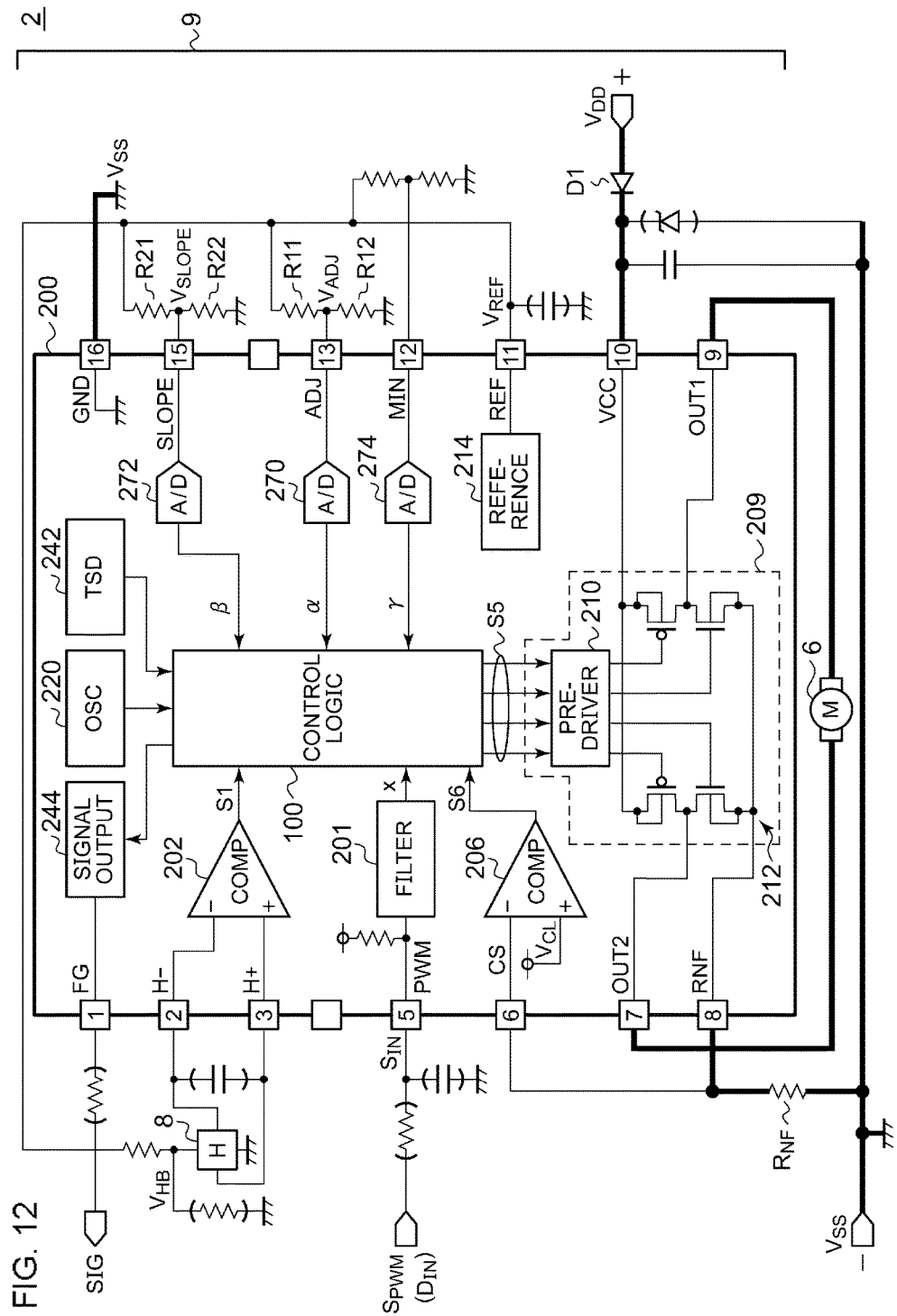
FIG. 12 is a circuit diagram showing a configuration of a cooling apparatus including a driving IC according to a third embodiment.

FIG. 12 is a circuit diagram showing a configuration of a cooling apparatus 2 including a driving IC 200 according to a third embodiment. As shown in FIG. 10, the cooling apparatus 2 is mounted on a desktop computer, laptop computer, workstation, game machine, audio device, video device, or the like, for example. The cooling apparatus 2 cools a cooling target (not shown) such as a CPU (Central Processing Unit), GPU (Graphics Processing Unit), power supply apparatus, or the like. The cooling apparatus 2 includes a fan motor 6 arranged such that it faces the cooling target, and a driving apparatus 9 that drives the fan motor 6.

The driving apparatus 9 is configured including the driving IC 200 according to the third embodiment and its peripheral components. The components of the driving apparatus 9 are mounted on a common printed circuit board. FIG. 12 shows only a part of the driving IC 200 relating to the present invention, and unrelated components are omitted.

The fan motor 6 is configured as a brushless DC motor. A Hall sensor 8 is arranged in the vicinity of the fan motor 6 in order to detect the position of the rotor. The driving IC 200 is configured as a function IC integrated on a single semiconductor substrate.

The driving IC 200 receives, as its input signal from an external circuit via a rotational speed control terminal (PWM) configured as the fifth pin, a rotational speed control signal $S_{IN}$ which indicates the rotational speed to be set for the fan motor 6. The driving IC 200 PWM (Pulse Width Modulation) drives the fan motor 6 according to the rotational speed control signal $S_{IN}$.

In the present embodiment, the rotational speed control terminal (PWM) configured as the fifth pin receives, as the rotational speed control signal $S_{IN}$, an input pulse modulation signal (input PWM signal) $S_{PWM}$ having an input duty ratio $D_{IN}$. An input circuit 201 receives the input pulse modulation signal $S_{PWM}$, and generates an input digital value x that corresponds to the input duty ratio $D_{IN}$. The input circuit 201 may be configured as a digital filter. Also, the input circuit 201 may be configured as a combination of an analog filter and an A/D converter. A combination of the PWM terminal and the input circuit 201 will also be referred to as the "rotational speed control input unit".

A ground terminal (GND) configured as the sixteenth pin of the driving IC 200 is grounded. The power supply voltage $V_{DD}$ is input to a power supply terminal (VCC) configured as the tenth pin via a reverse-current blocking diode D1. The output of a driving stage 230 is connected to the fan motor 6 via the ninth pin (OUT1) and the seventh pin (OUT2). It should be noted that, in the present specification, each pin number is defined for convenience. That is to say, there is no relation between the pin number definition and the pin layout or the like.

Hall signals H+ and H− generated by the Hall sensor 8 are respectively input to Hall input terminals (H+ and H−) configured as the second pin and the third pin. A Hall comparator 202 compares the Hall signals H− and H+, generates a pulse signal S1 which indicates the position of the rotor, and outputs the pulse signal S1 thus generated to a control logic circuit 100. The control logic circuit 100 performs a commutation control operation in synchronization with the pulse signal S1.

A reference voltage source 214 generates a reference voltage $V_{REF}$ stabilized to a predetermined voltage level. The reference voltage $V_{REF}$ is output to an external circuit via a reference voltage terminal (REF) configured as the eleventh pin. The reference voltage $V_{REF}$ is supplied to the Hall sensor 8 as a Hall bias signal $V_{HB}$.

A first setting terminal (ADJ) configured as the thirteenth pin receives the first information which indicates the first parameter α. In the present embodiment, the first information is supplied as an analog voltage $V_{ADJ}$ to the ADJ terminal. For example, resistors R11 and R12 are connected as external components to the driving IC 200. By dividing the reference voltage $V_{REF}$, such an arrangement generates the analog voltage $V_{ADJ}$. In this case, the first parameter α can be set according to the voltage dividing ratio between the resistors R11 and R12. A first A/D converter 270 converts the analog voltage $V_{ADJ}$ input to the ADJ terminal into the first parameter α in the form of digital data. Such a combination of the ADJ terminal and the first A/D converter 270 will also be referred to as the "first setting input unit".

A second setting terminal (SLOPE) configured as the fifteenth pin receives the second information which indicates the second parameter β. In the present embodiment, the second information is supplied as an analog voltage $V_{SLOPE}$ to the SLOPE terminal. For example, resistors R21 and R22 are connected as external components to the driving IC 200. By dividing the reference voltage $V_{REF}$, such an arrangement generates the analog voltage $V_{SLOPE}$. In this case, the second parameter β can be set according to the voltage dividing ratio between the resistors R21 and R22. A second A/D converter 272 converts the analog voltage $V_{SLOPE}$ input to the SLOPE terminal into the second parameter β in the form of digital data. Such a combination of the SLOPE terminal and the second A/D converter 272 will also be referred to as the "second setting input unit".

A third setting terminal (MIN) configured as the twelfth pin receives the third information which indicates the third parameter γ. In the present embodiment, the third information is supplied as an analog voltage $V_{MIN}$ to the MIN terminal. For example, resistors R31 and R32 are connected as external components to the driving IC 200. By dividing the reference voltage $V_{REF}$, such an arrangement generates the analog voltage $V_{MIN}$. In this case, the third parameter γ can be set according to the voltage dividing ratio between the resistors R31 and R32. A third A/D converter 274 converts the analog voltage $V_{MIN}$ input to the MIN terminal into the third parameter γ in the form of digital data. Such a combination of the MIN terminal and the third A/D converter 274 will also be referred to as the "third setting input unit".

The control logic circuit 100 calculates an output duty ratio $D_{OUT}$ based on the input digital value x, the first parameter α, the second parameter β, and the third parameter γ. Furthermore, the control logic circuit 100 generates a control pulse having the output duty ratio $D_{OUT}$ thus calculated. The control logic circuit 100 combines an output S1 of the Hall comparator 202 and the control pulse so as to generate a driving signal S5.

A driving stage 209 includes a pre-driver 210 and an H-bridge circuit 212. The pre-driver 210 drives the H-bridge circuit 212 according to the driving signal S5. With such an arrangement, the outputs OUT1 and OUT2 are alternately switched to an active state (commutation control operation) in synchronization with the output S1 of the Hall comparator 202. That is to say, the output in the active state is switched according to the control pulse (PWM driving operation). It should be noted that the driving stage 209 may have the same configuration as that of the driving stage 230 shown in FIG. 1.

An RNF terminal configured as the eighth pin is connected to the lower-side terminal of the H-bridge circuit 212. A current detection resistor $R_{NF}$ is inserted between the RNF terminal and an external ground terminal. A detection voltage $V_{NF}$ occurs at the resistor $R_{NF}$ in proportion to the current that flows through the fan motor 6. The detection voltage $V_{NF}$ is input to a current detection terminal (CS) configured as the sixth pin. A current clamp comparator 206 compares the detection voltage $V_{NF}$ with a predetermined voltage $V_{CL}$. The voltage $V_{CL}$ determines the upper limit of the current that flows through the fan motor 6. When an output (current limit signal) S6 of the current clamp comparator 206 is asserted (set to the high level), the control logic circuit 100 switches the logical value of the driving signal S5 so as to suspend the supply of electric power to the fan motor 6.

A TSD circuit 242 detects an overheating state. A signal output circuit 244 generates an FG (Frequency Generator) signal having a frequency that corresponds to the rotational speed of the fan motor 6, and outputs the FG signal thus generated via an FG terminal configured as the first pin.

The above is the overall configuration of the driving IC 200. Next, description will be made regarding the internal configuration thereof.

Figure 13:
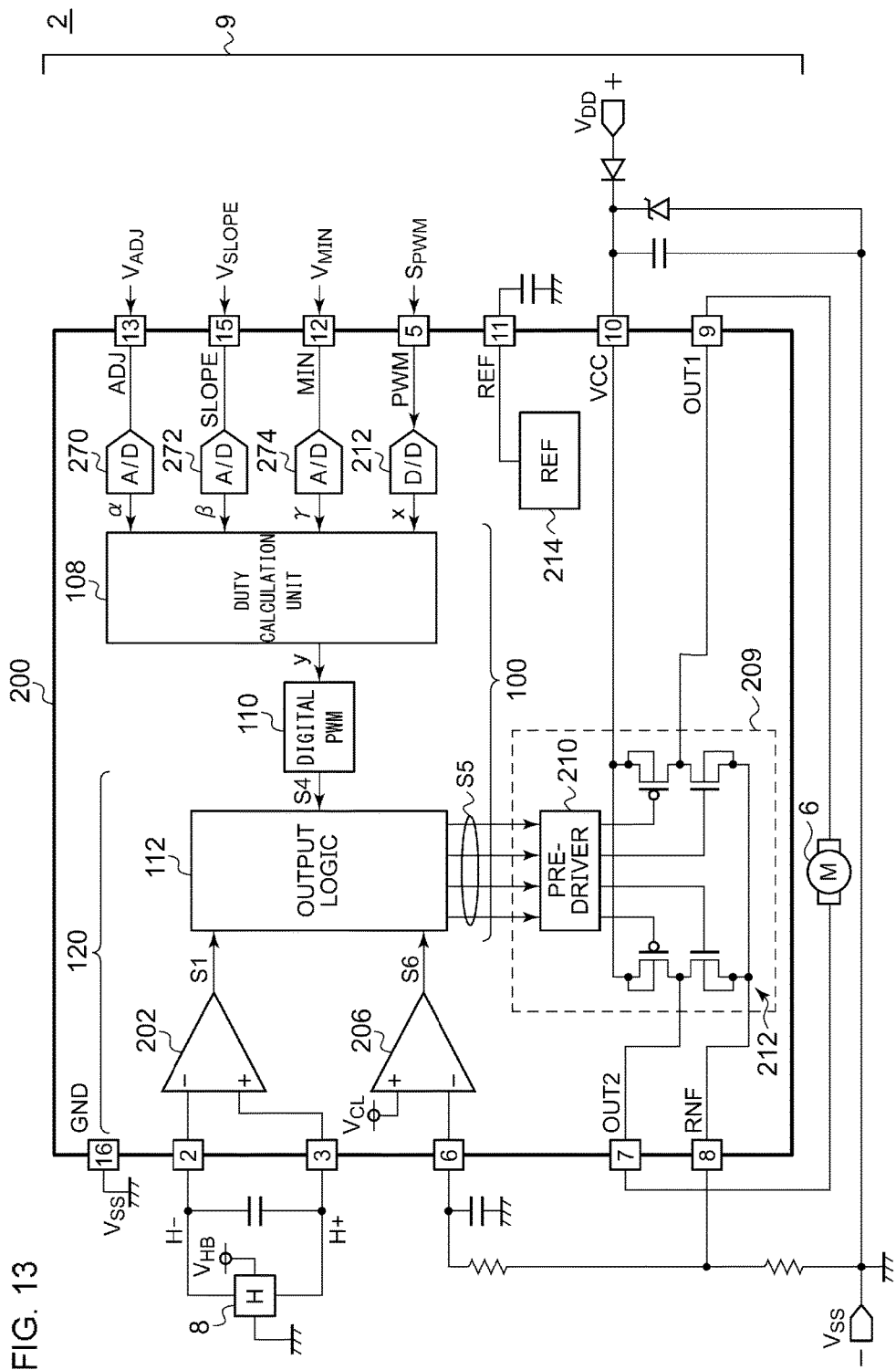
FIG. 13 is a block diagram showing a configuration of the driving IC shown in FIG. 12.

FIG. 13 is a block diagram showing a configuration of the driving IC 200 shown in FIG. 12. It should be noted that FIG. 13 shows only a configuration for generating the driving signal S5, and other configurations will be omitted as appropriate.

The control logic circuit 100 includes a duty calculation unit 108, a digital pulse modulator 110, and an output logic unit 112. The control logic circuit 100 may be configured as a hardware logic component. Also, the control logic circuit 100 may be configured as a combination of a processor and a software component.

Figure 14:
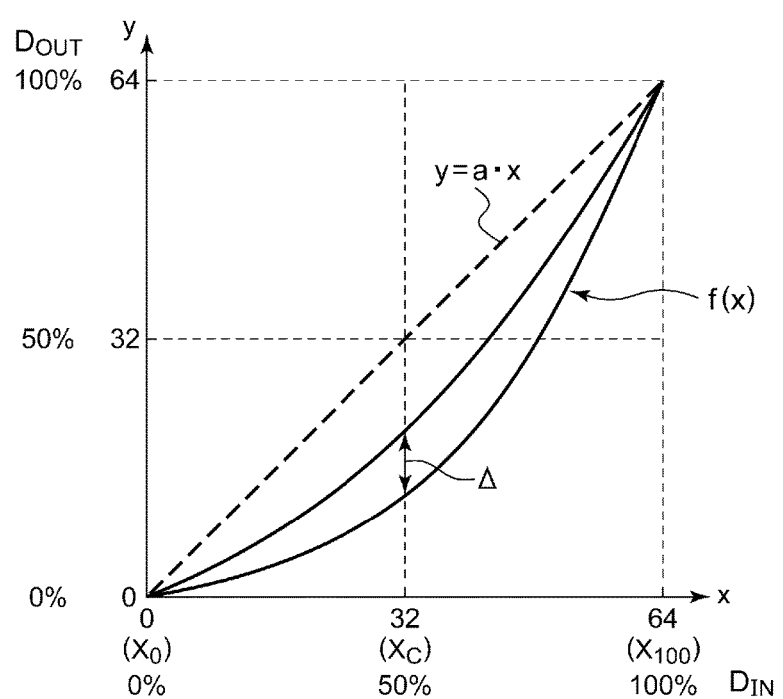
FIG. 14 is a diagram showing a correction function f(x)

The duty calculation unit 108 holds a correction function f(x), and calculates a duty instruction value y=f(x) using the correction function. FIG. 14 is a diagram showing the correction function f(x). Here, the horizontal axis represents x, and the vertical axis represents y. An input digital value that corresponds to the minimum value of the rotational speed control signal $S_{PWM}$ (i.e., a duty ratio of 0%) is represented as $x_0$, and an input digital value that corresponds to the maximum value of the rotational speed control signal $S_{PWM}$ (i.e., a duty ratio of 100%) is represented as $x_{100}$. In the present embodiment, the input digital value x is configured as 6-bit data. That is to say, $x_0=0$, and $x_{100}=64$.

FIG. 14 shows a straight line function represented by y=ax. In this drawing, a=1. The correction function f(x) satisfies the conditions $f(x_0)=ax_0$, and $f(x_{100})=ax_{100}$, and is configured such that it protrudes downward. Such a nonlinear (bow-shaped) correction function f(x) may be configured as a curve derived based on theoretical analysis results. Also, the reduction in the efficiency shown in FIG. 3C may be calculated by means of fitting calculation, and the nonlinear correction function f(x) may be obtained by means of back calculation based on the reduction in efficiency thus calculated. Also, the non-linear correction function f(x) may be configured as an approximate value obtained by means of the fitting calculation and the back calculation described above. The correction function y=f(x) has the first parameter α which allows the degree of curvature to be adjusted.

Description will be made below regarding each parameter. Here, an input digital value $x_0$ represents an input digital value which provides the largest difference between (a·x) and f(x). In FIG. 14, $x_c$ matches a value that corresponds to the input duty ratio $D_{IN}$ of 50% (i.e., 32). The first parameter α determines the difference Δ between (a·$x_c$) and f($x_c$). The second parameter β determines the slope a of the function f=a·x. The duty calculation unit 108 uses the third parameter γ as the minimum value to clamp the duty instruction value y. That is to say, the third parameter γ determines the minimum value of the output duty ratio $D_{OUT}$, i.e., the minimum rotational speed of the fan motor 6. FIG. 14 shows an example in which γ=0.

Figure 15A:
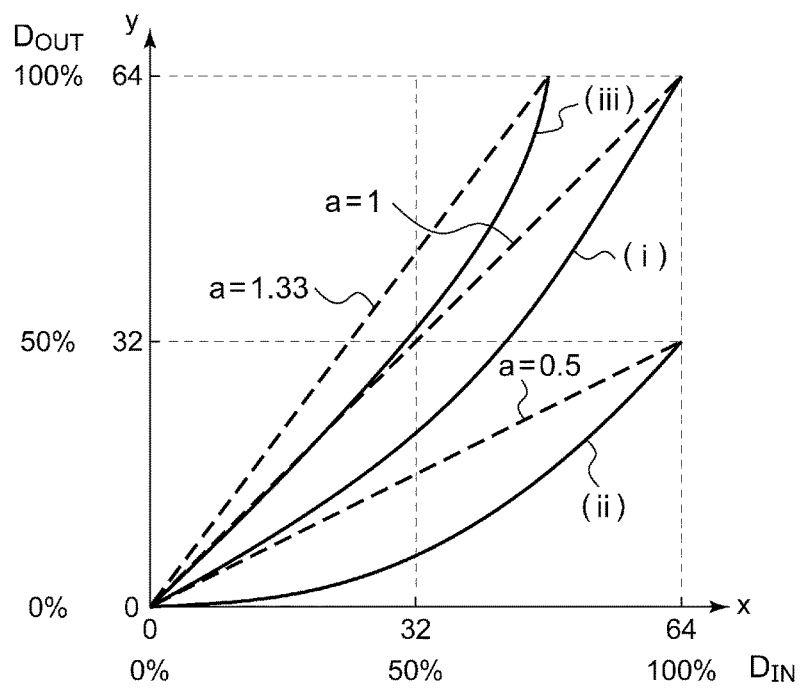
FIGS. 15A and 15B are diagrams for describing the parameter dependence of the input/output characteristics of a duty calculation unit.
Figure 15B:
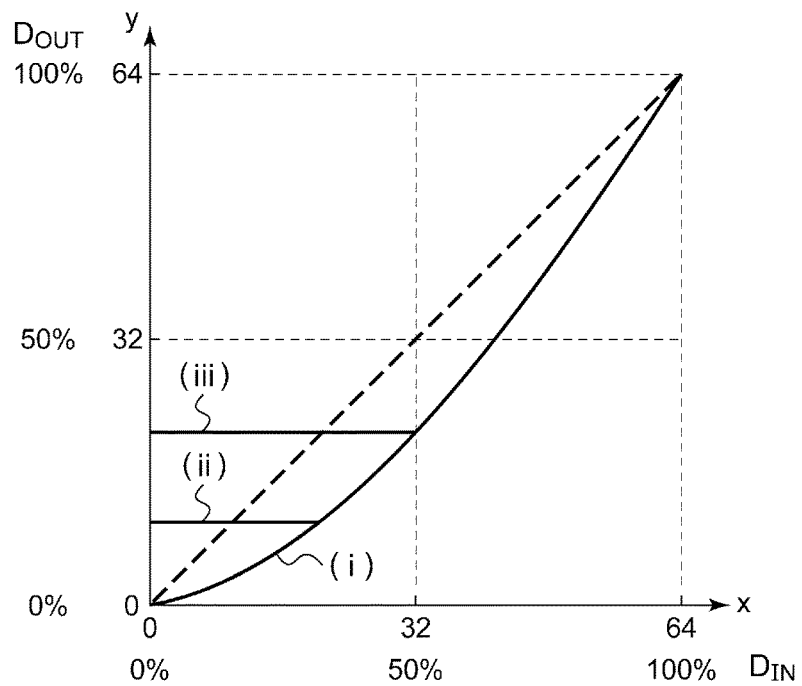

FIGS. 15A and 15B are diagrams for describing the parameter dependence of the input/output characteristics of the duty calculation unit 108. FIG. 15A shows the input/output characteristics when the second parameter β is changed. The curves (i) through (iii) represent the characteristics with a=1, 0.5, and 1.33, respectively. FIG. 15B shows the input/output characteristics when the third parameter γ is changed.

Returning to FIG. 13, description will be made. The digital pulse modulator 110 generates a control pulse S4 having the output duty ratio $D_{OUT}$ that corresponds to the duty instruction value y. The digital pulse modulator 110 can be configured employing a digital counter.

An output circuit 120 drives the fan motor 6 according to at least the control pulse S4. The output circuit 120 includes the output logic unit 112 included in the control logic circuit 100, the driving stage 209, the Hall comparator 202, and the current clamp comparator 206.

The output logic unit 112 generates the driving signal S5 based on the pulse signal S1 received from the Hall comparator 202, a current limit signal S6 received from the current clamp comparator 206, and the control pulse S4. The output logic unit 112 may preferably be configured using known techniques.

The above is the configuration of the driving IC 200. Next, description will be made regarding the operation thereof.

Figure 16A:
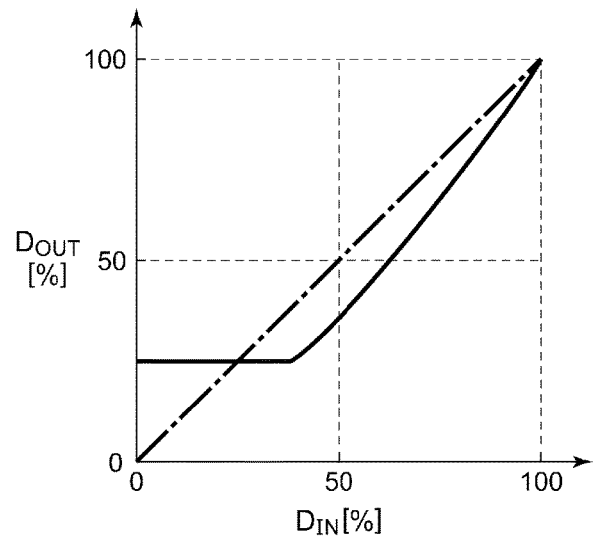
FIG. 16A is a diagram showing the relation between the input duty ratio $D_{IN}$ and the output duty ratio $D_{OUT}$ of the driving IC.
Figure 16B:
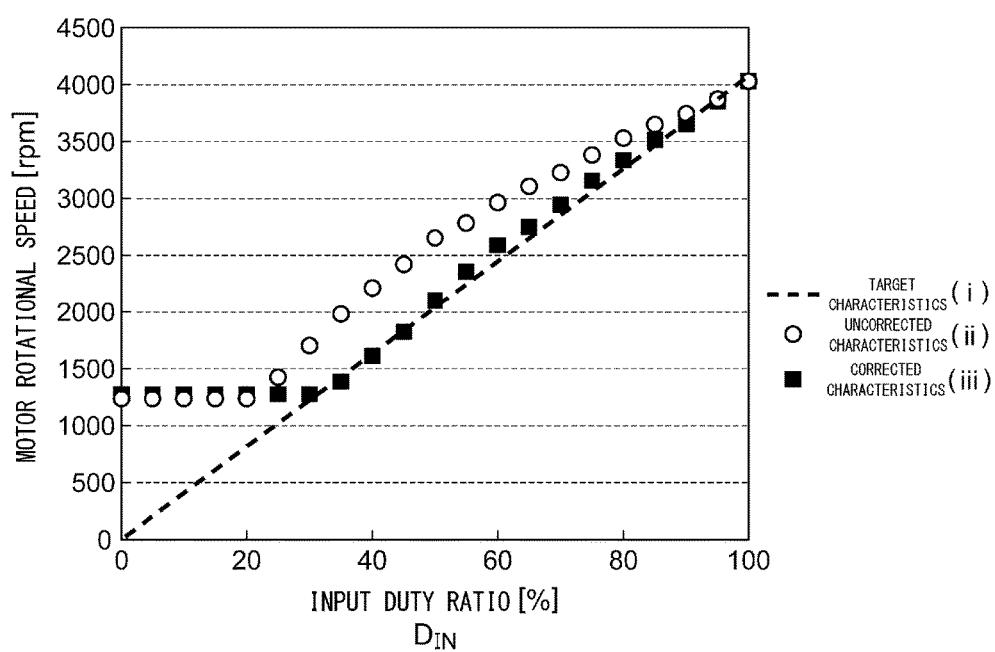
FIG. 16B is a diagram showing the relation between the input duty ratio $D_{IN}$ and the rotational speed of the fan motor.

FIG. 16A is a diagram showing the relation between the input duty ratio $D_{IN}$ and the output duty ration $D_{OUT}$ of the driving IC 200. FIG. 16B is a diagram showing the relation between the input duty ratio $D_{IN}$ and the rotational speed of the fan motor 6. In this drawing, (i) represents the target characteristics, (ii) represents the characteristics obtained by calculating the output duty ratio based on the function y=a·x, instead of using the correction function f(x), and (iii) represents the characteristics of the driving IC 200 shown in FIG. 12.

As described above, with the driving IC 200 according to the third embodiment, such an arrangement allows the actual rotational driving characteristics (iii) to approach the target characteristics (i). That is to say, such an arrangement provides improvement in the linearity of the ratio of the rotational speed with respect to the rotational speed control signal $S_{PWM}$.

In particular, with the driving IC 200 according to the third embodiment, such an arrangement is capable of adjusting the degree of curvature of the correction function f(x) according to the first information $V_{ADJ}$ supplied to the ADJ terminal. Thus, by adjusting the curvature of the correction function according to the kind and characteristics of the fan motor 6 to be driven, the shape of the fan, and the environment in which the cooling apparatus 2 is operated, such an arrangement provides improved linearity in various situations.

Furthermore, such an arrangement is capable of adjusting the slope of the correction function f(x) according to the second information $V_{SLOPE}$ supplied to the SLOPE terminal. Moreover, such an arrangement is capable of setting the minimum rotational speed according to the third information $V_{MIN}$ supplied to the MIN terminal.

The third embodiment has also been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications relating to the third embodiment.

First Modification

Figure 17A:
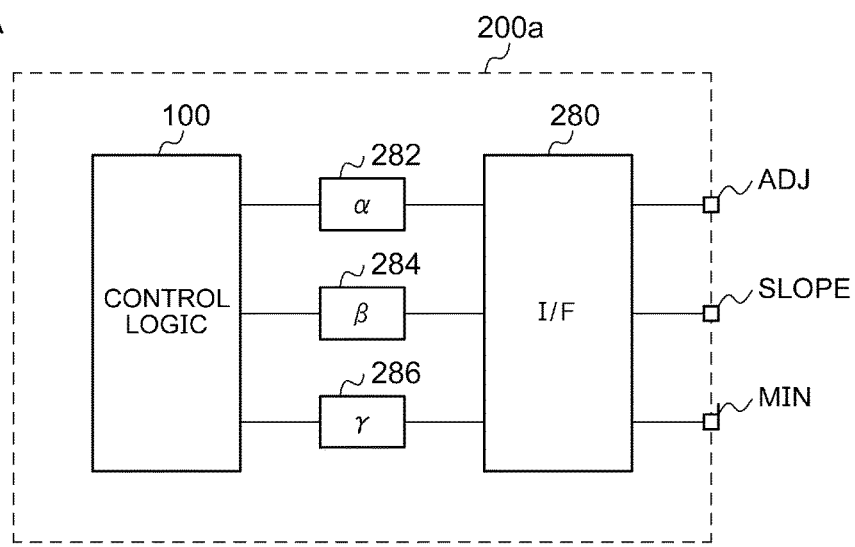
FIG. 17A is a block diagram showing a driving IC according to a first modification.

FIG. 17A is a block diagram showing a driving IC 200a according to a first modification. In this modification, the first information which indicates the first parameter α is input to the ADJ terminal in the form of digital data. An interface circuit 280 receives the digital data input to the ADJ terminal, and acquires the first parameter α. First memory 282 holds the first parameter α. Similarly, the second information which indicates the second parameter β is input to the SLOPE terminal in the form of digital data. Furthermore, the third information which indicates the third parameter γ is input to the MIN terminal in the form of digital data. The interface circuit 280 acquires the second parameter β and the third parameter γ from the digital data thus received, and stores the second parameter β and the third parameter γ in second memory 284 and third memory 286, respectively. For example, the interface circuit 280 may be configured as an I²C bus receiver. It should be noted that, in a case in which each digital data is transmitted by means of time-division multiplexing, the ADJ terminal, the SLOPE terminal, and the MIN terminal may be configured as a common terminal. Also, the memory 282, 284, and 286 may each be configured as nonvolatile memory or otherwise volatile memory.

Second Modification

Figure 17B:
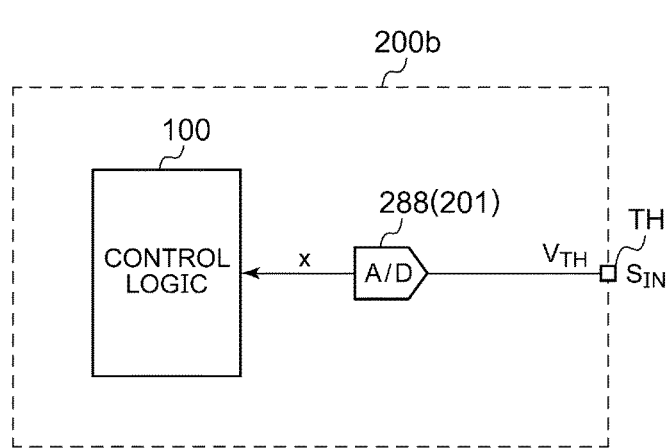
FIG. 17B is a block diagram showing a driving IC according to a second modification.

Description has been made in the embodiment regarding an arrangement in which the rotational speed control signal $S_{PWM}$ subjected to pulse width modulation is input to the PWM terminal. However, the present invention is not restricted to such an arrangement. FIG. 17B is a block diagram showing a driving IC 200b according to a second modification. The driving IC 200b includes a TH terminal for receiving the rotational speed control signal $S_{IN}$ in the form of an analog voltage $V_{TH}$, instead of the PWM terminal. Furthermore, the driving IC 200b includes an A/D converter 288 as the input circuit 201 that converts the voltage supplied to the TH terminal into an input digital value x.

Third Modification

Description has been made regarding an arrangement in which $x_C$ shown in FIG. 14 represents a value that corresponds to a $D_{IN}$ of 50%. However, the present invention is not restricted to such an arrangement. Also, an arrangement may be made in which $x_C$ represents a value that corresponds to a $D_{IN}$ ranging between 33% and 66%. Also, an arrangement may be made that allows an external circuit to input a fourth parameter for setting $x_C$.

Fourth Modification

Description has been made in the embodiment regarding an arrangement which allows an external circuit to set the second parameter β and the third parameter γ. Also, with the driving IC 200, either one of or otherwise both of them may be determined beforehand. Such an arrangement allows the number of terminals and the number of external resistors to be reduced.

Fifth Modification

Description has been made in the embodiment regarding an arrangement in which the fan motor to be driven is configured as a single-phase driving motor. However, the present invention is not restricted to such an arrangement. Also, the present invention is applicable to various kinds of motors such as two-phase and three-phase motors.

Sixth Modification

Description has been made in the embodiment regarding an arrangement in which the Hall sensor 8 is connected as an external component to the driving IC 200. Also, the Hall sensor 8 may be built into the driving IC 200. Also, such a Hall sensor 8 may be omitted. In this case, the present invention is also applicable to an arrangement configured to detect the position of the rotor based on back electromotive force, thereby providing a sensorless driving operation.

While the preferred embodiments of the present invention have been described using specific terms, such description is for illustrative purposes only, and it is to be understood that changes and variations may be made without departing from the spirit or scope of the appended claims.

What is claimed is:

1. A PWM (Pulse Width Modulation) motor driving apparatus that drives a fan motor, the motor driving apparatus comprising:
   a rotational speed control terminal coupled to receive an analog control voltage that indicates a rotational speed;
   a first oscillator terminal arranged such that, in a first platform, a capacitor and a discharging resistor are connected in parallel between the first oscillator terminal and a ground;
   a charging resistor and a first switch arranged in series between the first oscillator terminal and a reference voltage line via which a stabilized voltage is supplied;
   a switching circuit that turns off the first switch when an oscillator voltage that occurs at the first oscillator terminal reaches an upper-side threshold value, and that turns on the first switch when the oscillator voltage falls to a lower-side threshold value;
   a PWM comparator that compares a voltage at the rotational speed control terminal with the oscillator voltage, and generates a control pulse;
   an output circuit that drives the fan motor according to at least the control pulse; and
   a second oscillator terminal,
   wherein, in the first platform, the charging resistor is connected as an external component between the second oscillator terminal and the first oscillator terminal,
   and wherein the first switch is arranged between the second oscillator terminal and the reference voltage line.

2. The motor driving apparatus according to claim 1, monolithically integrated on a single semiconductor substrate.

3. A PWM (Pulse Width Modulation) motor driving apparatus that drives a fan motor, the motor driving apparatus comprising:
   a rotational speed control terminal coupled to receive an analog control voltage that indicates a rotational speed;
   a first oscillator terminal arranged such that, in a first platform, a capacitor and a discharging resistor are connected in parallel between the first oscillator terminal and a ground;
   a charging resistor and a first switch arranged in series between the first oscillator terminal and a reference voltage line via which a stabilized voltage is supplied;
   a switching circuit that turns off the first switch when an oscillator voltage that occurs at the first oscillator terminal reaches an upper-side threshold value, and that turns on the first switch when the oscillator voltage falls to a lower-side threshold value;
   a PWM comparator that compares a voltage at the rotational speed control terminal with the oscillator voltage, and generates a control pulse; and
   an output circuit that drives the fan motor according to at least the control pulse,
   wherein the switching circuit comprises:
   a first resistor, a second resistor, and a third resistor that are sequentially connected in series between the reference voltage line and the ground;
   a second switch arranged in parallel with the third resistor; and
   a comparator that compares a voltage at a connection node that connects the first resistor and the second resistor with the oscillator voltage,
   and wherein an on/off operation of each of the first switch and the second switch is controlled according to an output of the comparator.

4. A PWM (Pulse Width Modulation) motor driving apparatus that drives a fan motor, the motor driving apparatus comprising:
   a rotational speed control terminal coupled to receive an analog control voltage that indicates a rotational speed;
   a first oscillator terminal arranged such that, in a first platform, a capacitor and a discharging resistor are connected in parallel between the first oscillator terminal and a ground;
   a charging resistor and a first switch arranged in series between the first oscillator terminal and a reference voltage line via which a stabilized voltage is supplied;
   a switching circuit that turns off the first switch when an oscillator voltage that occurs at the first oscillator terminal reaches an upper-side threshold value, and that turns on the first switch when the oscillator voltage falls to a lower-side threshold value;
   a PWM comparator that compares a voltage at the rotational speed control terminal with the oscillator voltage, and generates a control pulse;
   an output circuit that drives the fan motor according to at least the control pulse;
   a first current source that sources a predetermined charging current to the oscillator terminal in an enable state; and
   a second current source that sinks a predetermined discharging current from the oscillator terminal in the enable state,
   wherein at least one from among the first current source and the second current source is configured such that the switching circuit is able to perform an on/off control operation thereof,
   and wherein the switching circuit is switchable between (i) a first mode in which the first current source and the second current source are each set to a disable state, and an on/off operation of the first switch is controlled, and (ii) a second mode in which the first switch is turned off, the first current source and the second current source are each set to an enable state, and an on/off operation of at least one from among the first current source and the second current source is controlled.

5. The motor driving apparatus according to claim 4, wherein the second mode is selected in a case of employing a second platform in which the discharging resistor is not connected to the oscillator terminal.

6. The motor driving apparatus according to claim 4, further comprising a selector terminal for receiving a selection signal which indicates the selection between the first mode and the second mode.

7. A PWM (Pulse Width Modulation) motor driving apparatus that drives a fan motor, the motor driving apparatus comprising:
   a rotational speed control terminal coupled to receive an analog control voltage that indicates a rotational speed;
   a first oscillator terminal arranged such that, in a first platform, a capacitor and a discharging resistor are connected in parallel between the first oscillator terminal and a ground;
   a charging resistor and a first switch arranged in series between the first oscillator terminal and a reference voltage line via which a stabilized voltage is supplied;
   a switching circuit that turns off the first switch when an oscillator voltage that occurs at the first oscillator terminal reaches an upper-side threshold value, and that turns on the first switch when the oscillator voltage falls to a lower-side threshold value;

a PWM comparator that compares a voltage at the rotational speed control terminal with the oscillator voltage, and generates a control pulse;

an output circuit that drives the fan motor according to at least the control pulse;

a first current source that sources a predetermined charging current to the oscillator terminal in an enable state; and a second current source that sinks a predetermined discharging current from the oscillator terminal in the enable state, wherein the switching circuit is switchable between a first mode in which the first current source and the second current source are each set to a disable state, and the first switch is controlled, and a second mode in which the first switch is turned off, and an on/off operation of the second current source is controlled.

8. The motor driving apparatus according to claim 7, wherein the switching circuit comprises:

a first resistor, a second resistor, and a third resistor that are sequentially connected in series between the reference voltage line and the ground;

a second switch arranged in parallel with the third resistor; and a comparator that compares a voltage at a connection node that connects the first resistor and the second resistor with the oscillator voltage;

and wherein (i) in the first mode, an on/off operation of each of the first switch and the second switch is controlled according to an output of the comparator, and (ii) in the second mode, an on/off operation of each of the second current source and the second switch is controlled according to the output of the comparator.

* * * * *